May 4, 1965 R. S. COBURN 3,181,630
BLASTHOLE DRILL
Filed July 3, 1962 14 Sheets-Sheet 1

INVENTOR:
ROBERT S. COBURN
BY Joseph Januszkiewicz
ATTORNEY

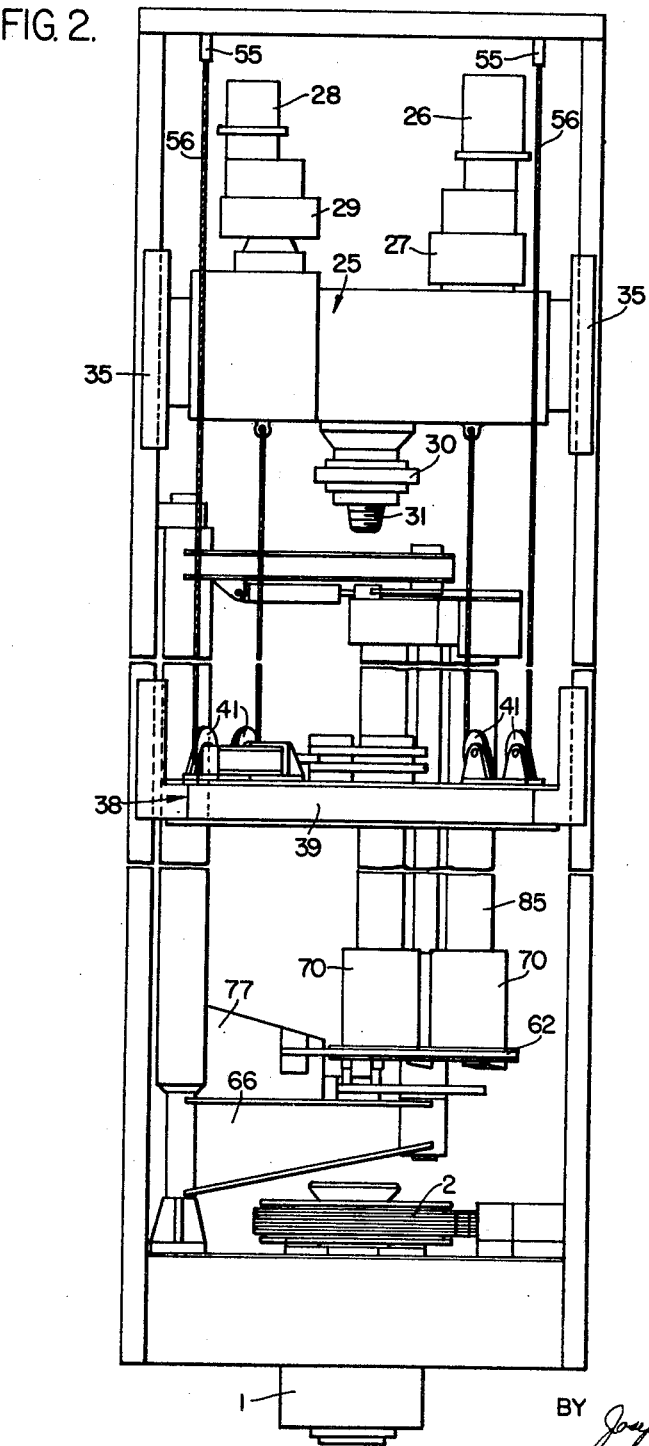

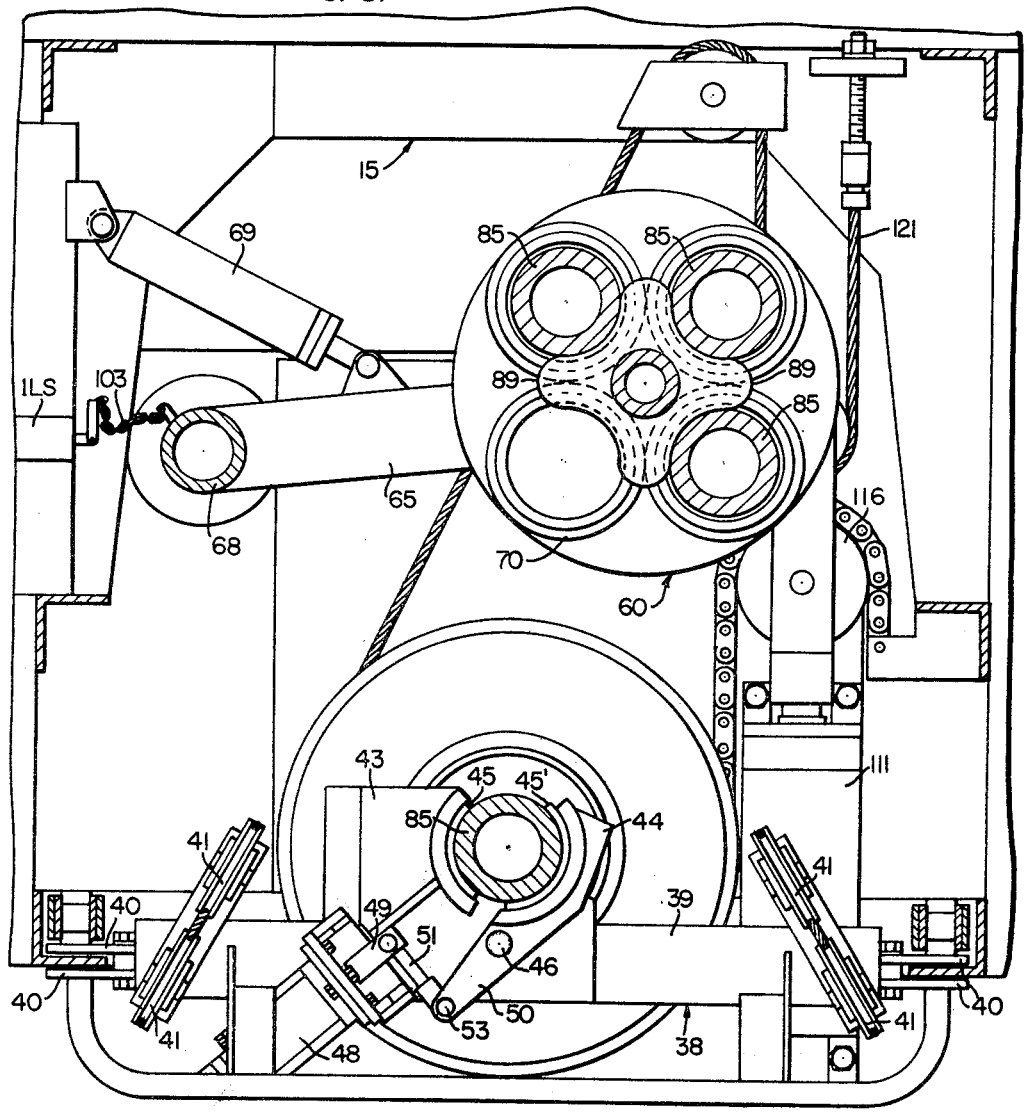

May 4, 1965 R. S. COBURN 3,181,630
BLASTHOLE DRILL
Filed July 3, 1962 14 Sheets-Sheet 4
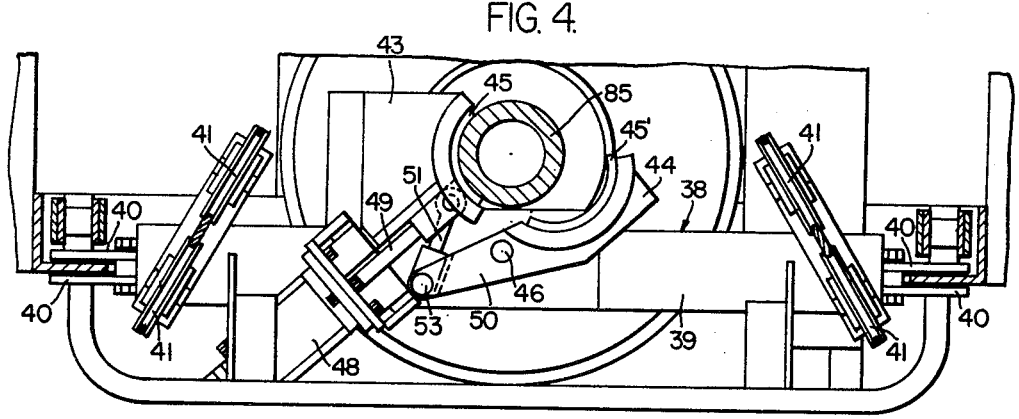
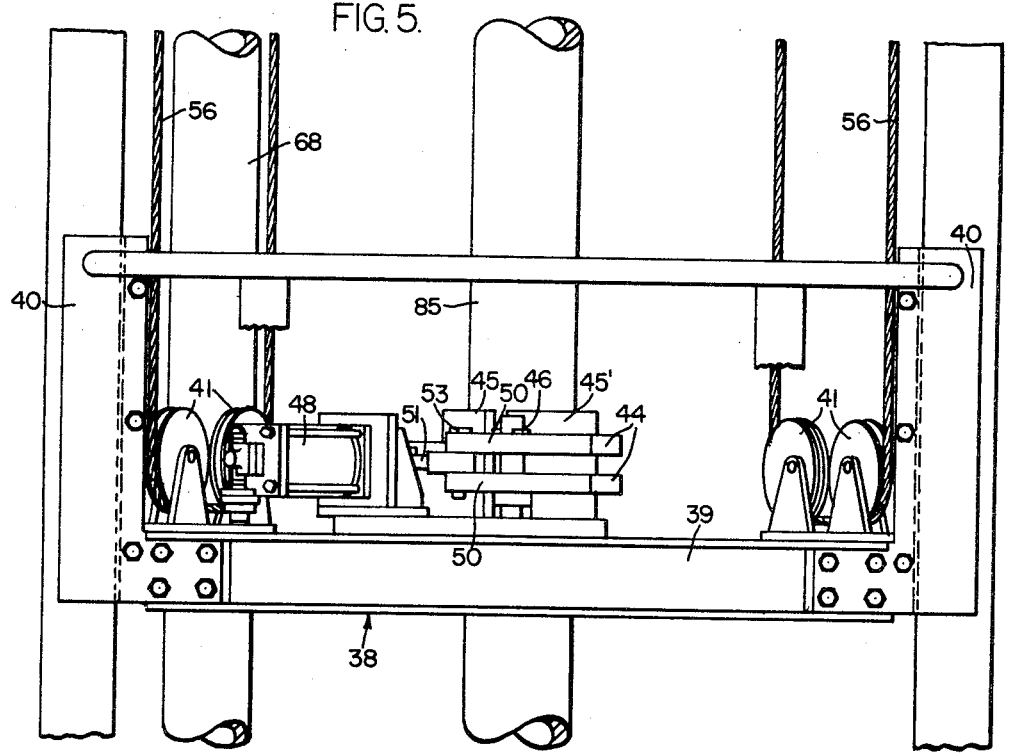
INVENTOR:
ROBERT S. COBURN
BY Joseph Januszkiewicz
ATTORNEY

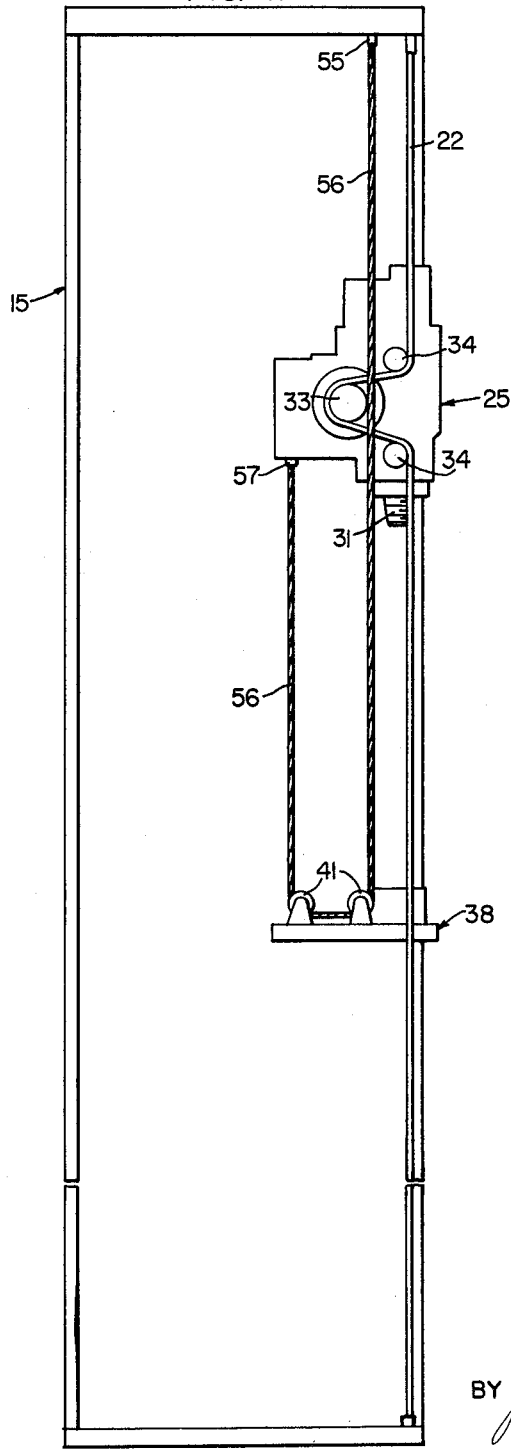

May 4, 1965  R. S. COBURN  3,181,630
BLASTHOLE DRILL
Filed July 3, 1962  14 Sheets-Sheet 6

INVENTOR:
ROBERT S. COBURN
BY Joseph Januszkiewicz
ATTORNEY

May 4, 1965  R. S. COBURN  3,181,630
BLASTHOLE DRILL
Filed July 3, 1962  14 Sheets-Sheet 7
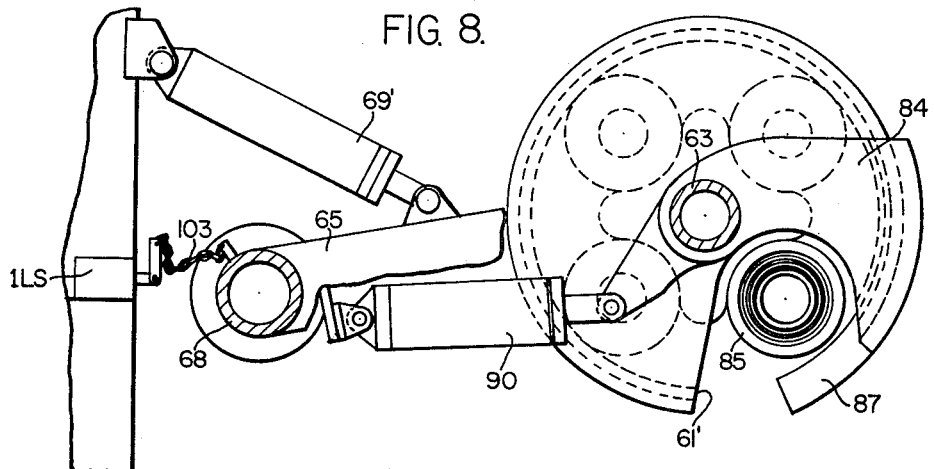
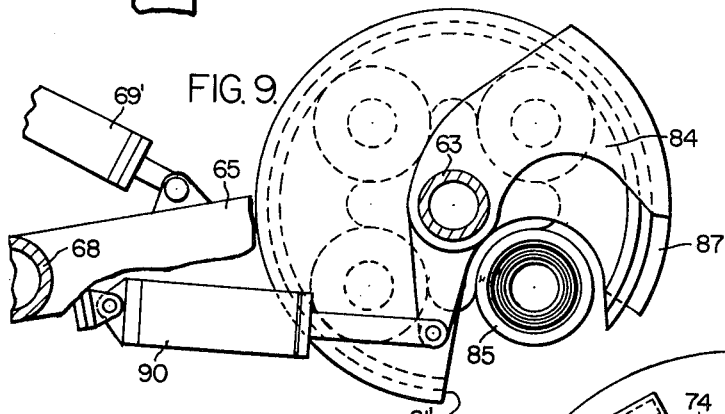
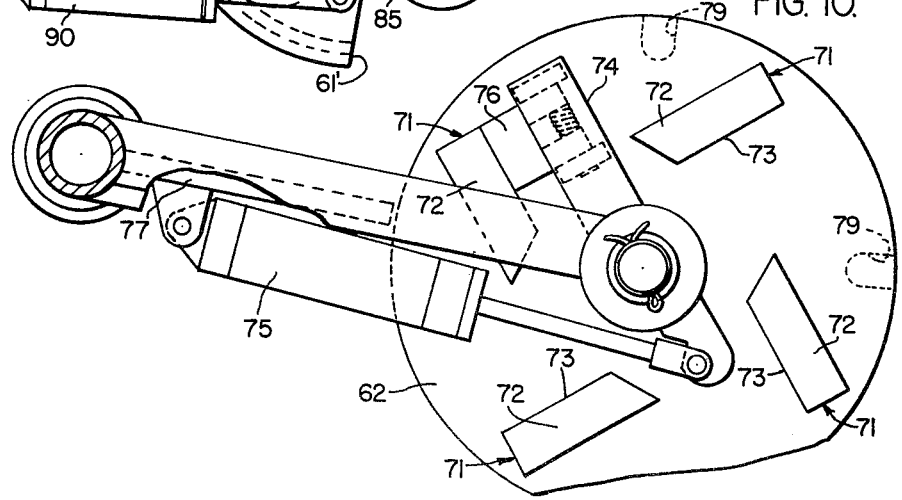
INVENTOR:
ROBERT S. COBURN
BY Joseph Januszkiewicz
ATTORNEY May 4, 1965  R. S. COBURN  3,181,630
BLASTHOLE DRILL
Filed July 3, 1962  14 Sheets-Sheet 8
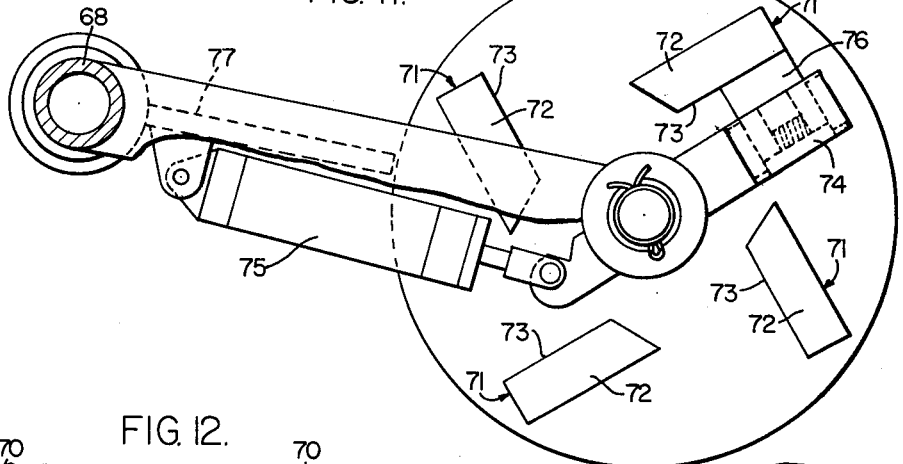
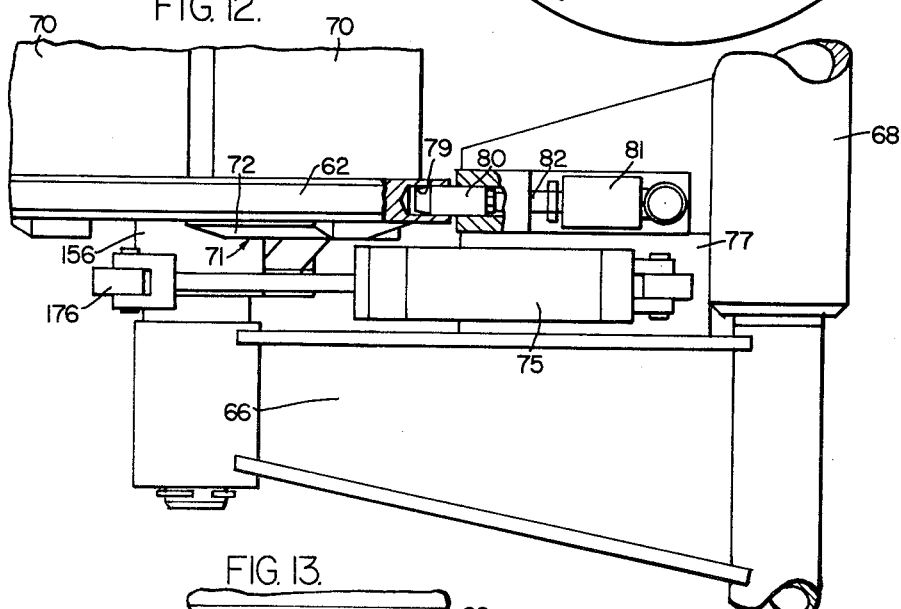
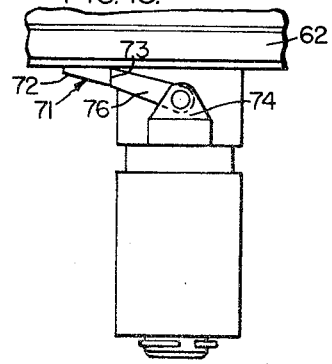
INVENTOR:
ROBERT S. COBURN
BY Joseph Januszkiewicz
ATTORNEY

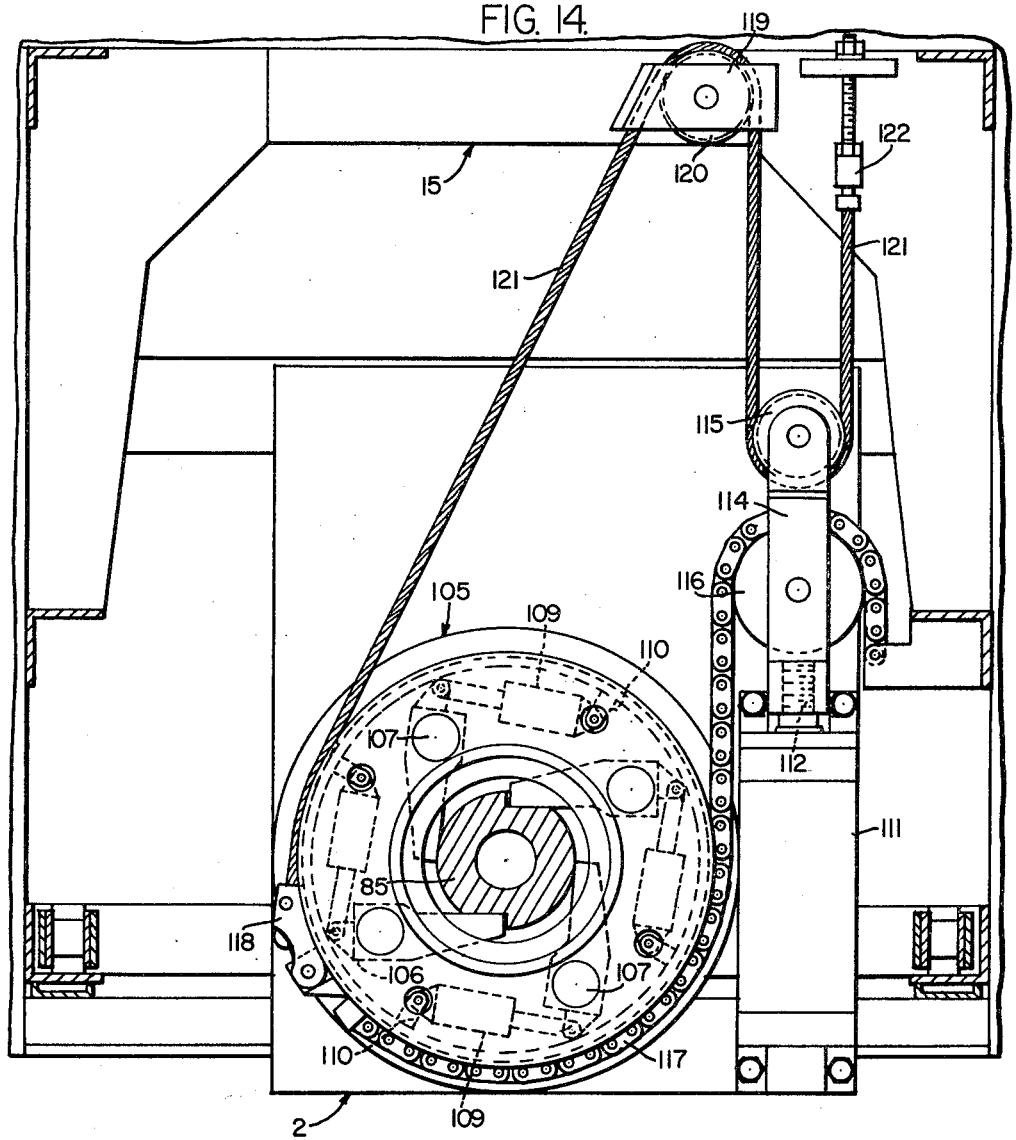

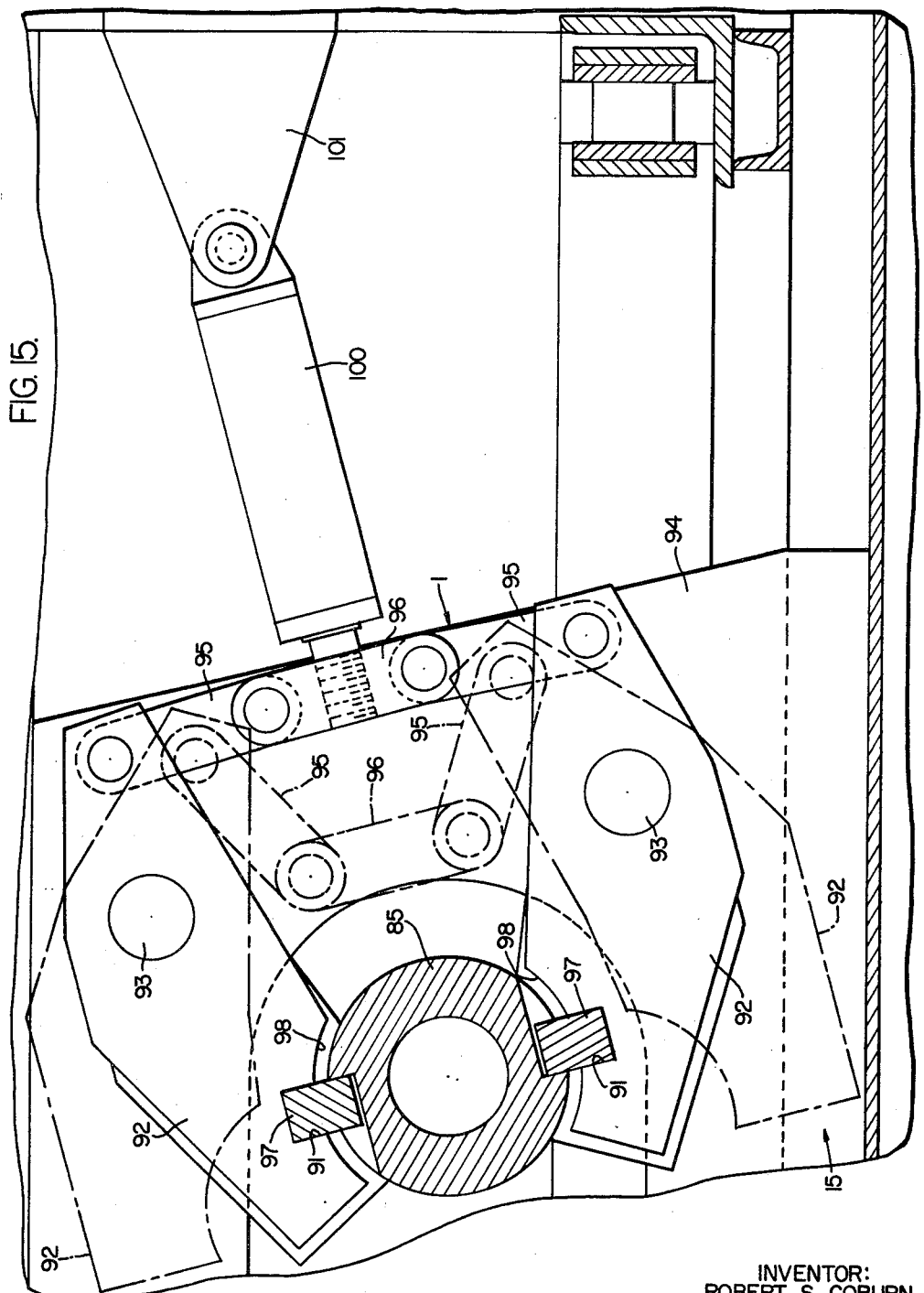

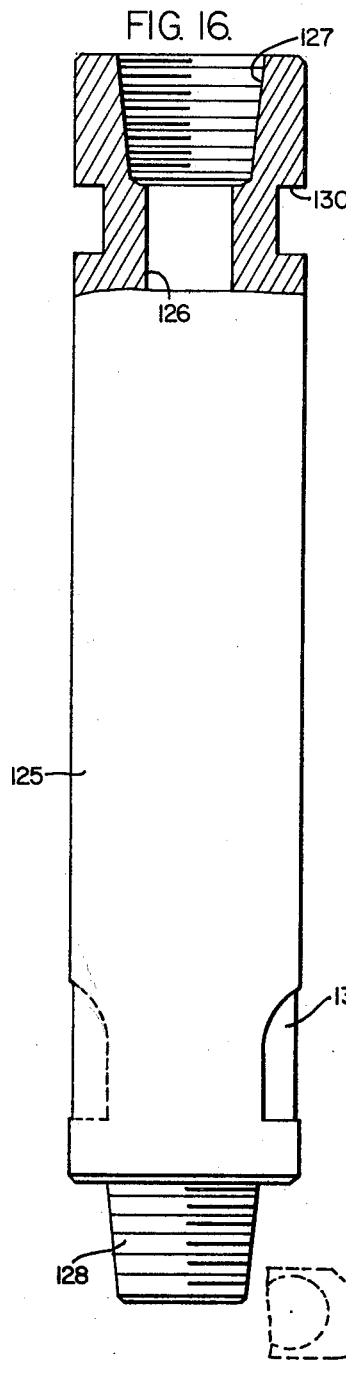
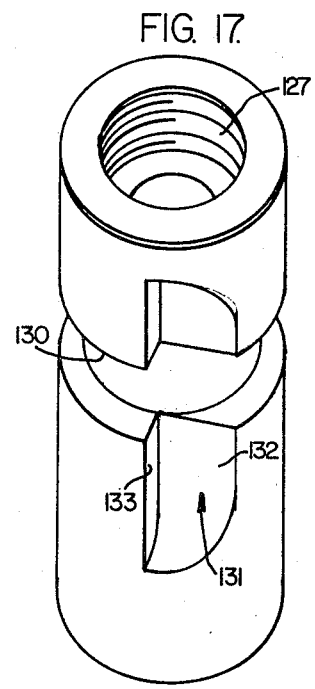
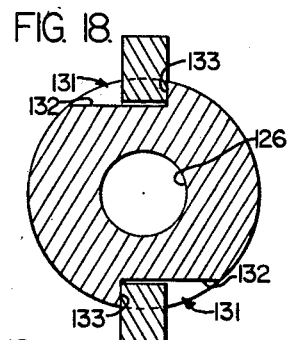
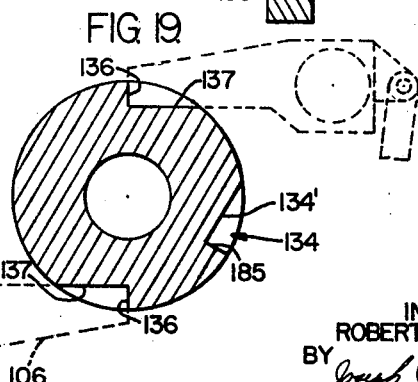

May 4, 1965 R. S. COBURN 3,181,630
BLASTHOLE DRILL
Filed July 3, 1962 14 Sheets-Sheet 12
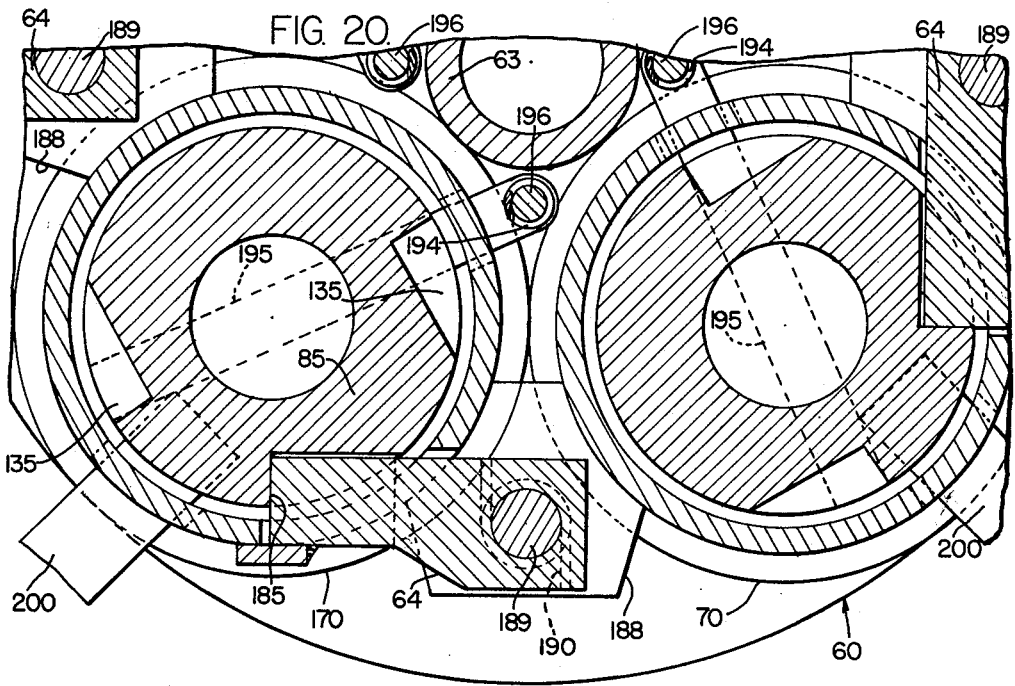
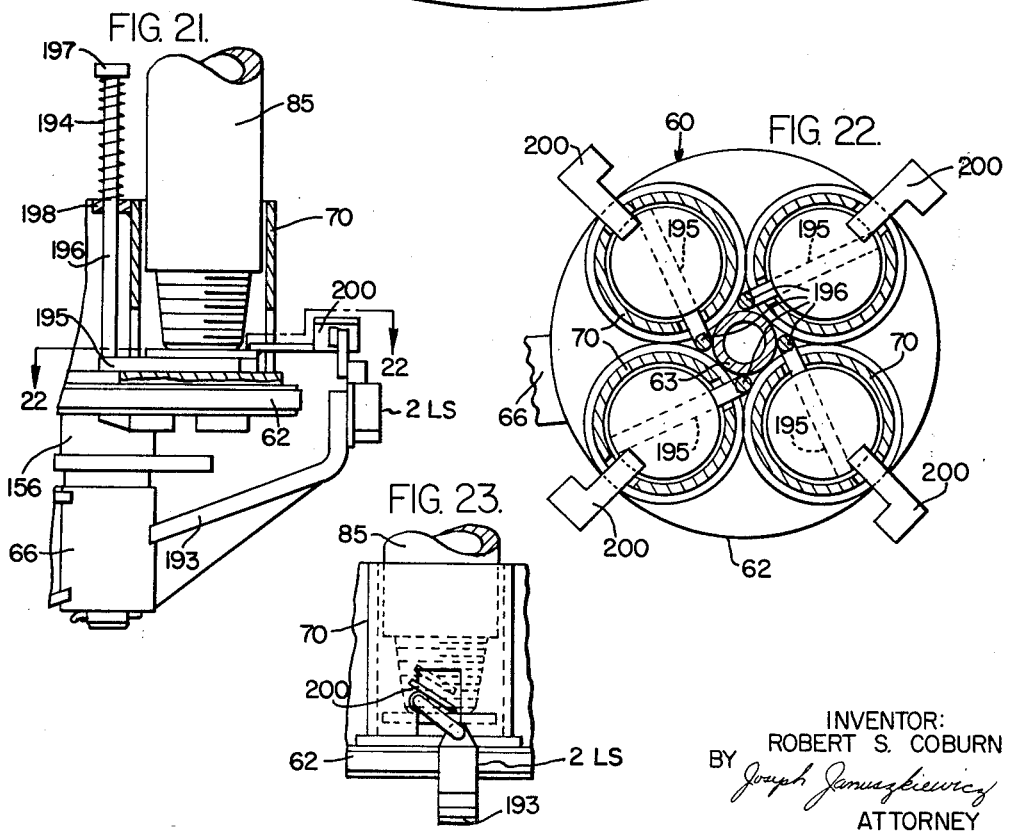
INVENTOR:
ROBERT S. COBURN
BY Joseph Januszkiewicz
ATTORNEY

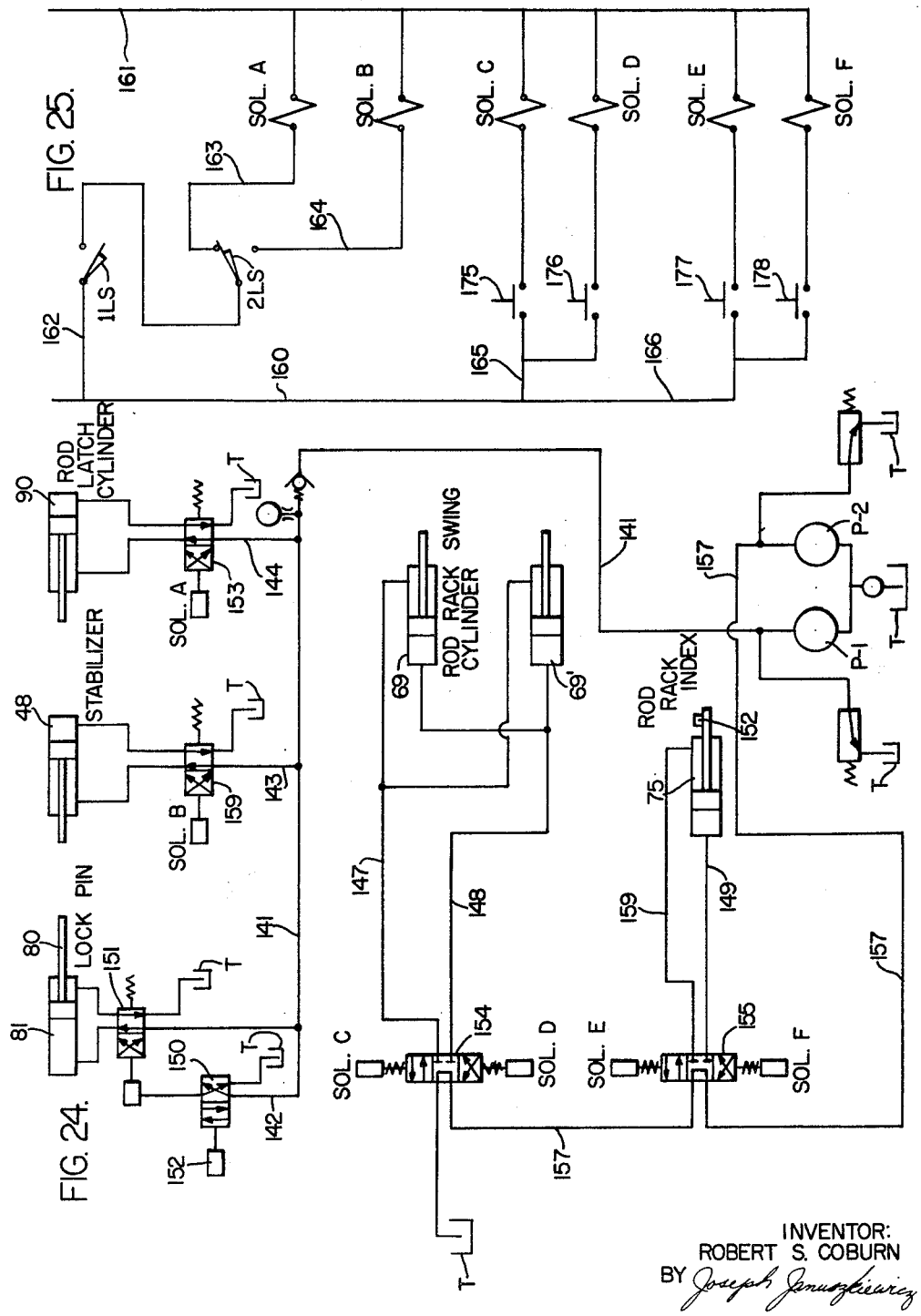

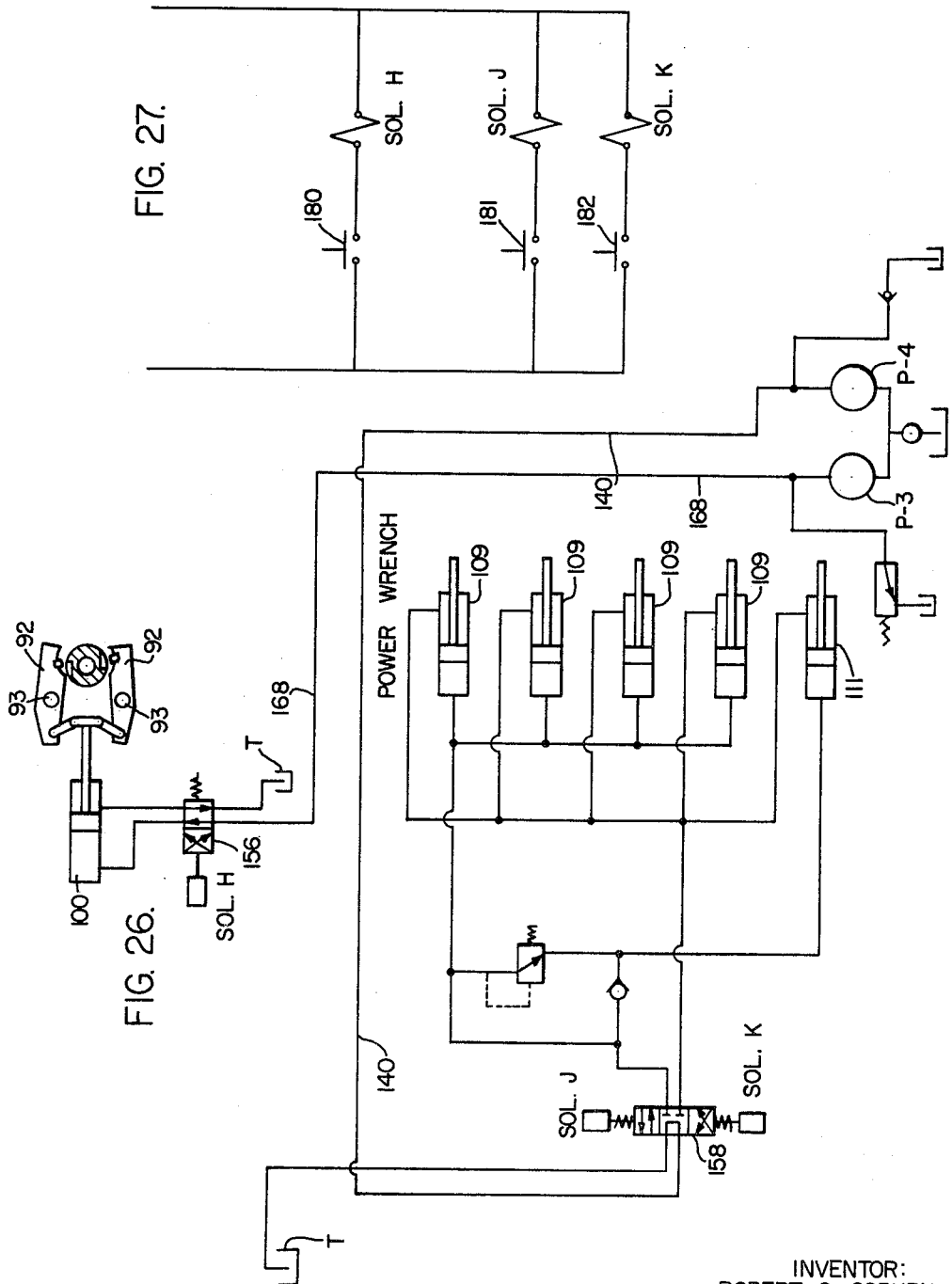

United States Patent Office 3,181,630
Patented May 4, 1965

3,181,630
BLASTHOLE DRILL
Robert S. Coburn, Oconomowoc, Wis., assignor to Joy
Manufacturing Company, Pittsburgh, Pa., a corporation
of Pennsylvania
Filed July 3, 1962, Ser. No. 207,269
5 Claims. (Cl. 175—85)

This invention relates to a blasthole drilling machine and more particularly to a new and improved self propelled, rotary blasthole drilling machine.

In the mining of coal and other minerals wherein an overburden is to be removed as in open pit mining or strip mining, blastholes are drilled to precise depths, packed with an explosive charge, and then detonated to loosen the overburden material to facilitate the removal of the overburden. In order to competitively mine such minerals it is necessary that the preparatory operations such as drilling the blastholes be done in a most economical manner to increase the depth of overburden that may be removed without losing the competitive advantage normally enjoyed by strip mining operations over underground mining. It is desirable to therefore design, a machine which is fully maneuverable, drill large diameter angle or vertical holes quickly, be able to approach the edge of the high wall to drill a hole adjacent thereto, and be able to index the storage rack or drill rods into the drilling position while the mast or derrick remains at an angle. Angle face drilling, a relatively new technique is strip and open pit mines, results in lowering the cost of blasting while achieving better fragmentation and maintaining a more stable highwall. In addition it is desirable that the blasthole drilling machine be able to drill vertical holes as well as angle holes, and vice versa in an efficient manner.

The general purpose of this invention is to provide a highly mobile and versatile blasthole drilling machine which will drill quickly and effectively large diameter blastholes at an angle or vertically while coordinating a storage rack to the rotary drive and pull down mechanism without requiring adjustments of the derrick during indexing of the storage rack. In addition this invention provides a highly mobile machine which is able to travel close to the edge of a high wall while maintaining stability assuring that the drilled blastholes are substantially in line and parallel to the edge of the high wall.

An object of the present invention is to provide a new and improved blasthole drilling machine.

Another object of this invention is to provide a new and improved blasthole drilling machine which can readily drill angle holes as well as vertical blastholes.

A further object of this invention is to provide a new and improved blasthole drilling machine which has a new and improved indexical storage rack cooperative with a stabilizing unit for the drill rods.

A further object of this invention is to provide a new and improved blasthole drilling machine which indexes drill rods into drilling position while the derrick and storage rack are at an angle as well as in a vertical position efficiently and quickly.

These and other objects will more fully appear in the accompanying drawings in which are shown for purposes of illustration one form of which the invention may assume in practice and in which;

FIG. 2 is an enlarged fragmentary front elevational view of the pull down rotary drive and pull down mechanism showing the rod stabilizing unit in cooperative relationship with the derrick;

FIG. 3 is a top plan view of the derrick taken along lines 3—3 of FIG. 1 showing the derrick, stabilizer and rod handling unit;

FIG. 4 is a top plan view of the stabilizer unit;

FIG. 5 is a front elevational view of the stabilizer unit taken along lines 5—5 of FIG. 1;

FIG. 6 is a schematic side elevational view of the rotary drive and pull down unit in cooperative relationship with the stabilizer unit on the derrick;

FIG. 8 is a top plan view of the storage rod handling unit showing the rod latch cylinder and a swing cylinder in cooperative relationship to the derrick taken along lines 8—8 of FIG. 7;

FIG. 9 is a top plan view of the storage rod handling unit and the rod latch cylinder showing the retraction of the rod latch which permits the removal of one of the drill rods from the rod handling unit;

FIG. 10 is a bottom plan view of the rod handling unit disclosing the cooperative relationship of the rod rack index cylinder to the rod handling unit taken along lines 10—10 of FIG. 7;

FIG. 11 is a botton plan view of the rod handling unit in cooperative relationship with the rod rack index cylinder in the retracted position prior to indexing the rod handling unit;

FIG. 12 is a side elevational view of the bottom portion of the rod handling unit in relation to the swing cylinder disclosing the index block cylinder and pin;

FIG. 13 discloses the spring bias flapper on the indexing portion of the index mechanism in relation to the inclined abutting surface of the rod handling unit;

FIG. 14 is a plan view of the power wrench mechanism showing the dogs engaged with recesses in a drill pipe;

FIG. 15 is a plan view of the power slip unit 1 mounted in the derrick;

FIG. 16 is a side elevational view of an elongated drill rod;

FIG. 17 is a perspective view of the upper portion of the drill rod;

FIG. 18 is a plan view of the drill rod taken along upper portion of the drill rod;

FIG. 19 is a plan view of the drill rod taken along the lower portion of the drill rod showing the dogs of a power wrench in engagement with the notches on the recesses on the lower portion of the drill rod;

FIG. 20 is a schematic plan view of the breakout dog and rod cup showing the breakout dog in cooperative engagement with a notch in the drill rod;

FIG. 21 is a partial fragmentary elevational view of the rod rack handling unit showing a lower portion of the drill rod seated in the rod cup in relation to the switch trip lever;

FIG. 22 is a schematic plan view of the rod cups showing the relationship of the switch trip lever to a rod cup;

FIG. 23 is a side elevational view of a rod cup and a switch trip lever;

FIG. 24 is a schematic hydraulic circuit diagram for the operation of the indexing operation of the drilling machine;

FIG. 25 is a schematic electrical circuit diagram of the indexing operation;

FIG. 26 is a schematic hydraulic circuit diagram of the power wrench mechanism;

FIG. 27 is a schematic electrical circuit diagram of the power wrench mechanism.

Figure 1:
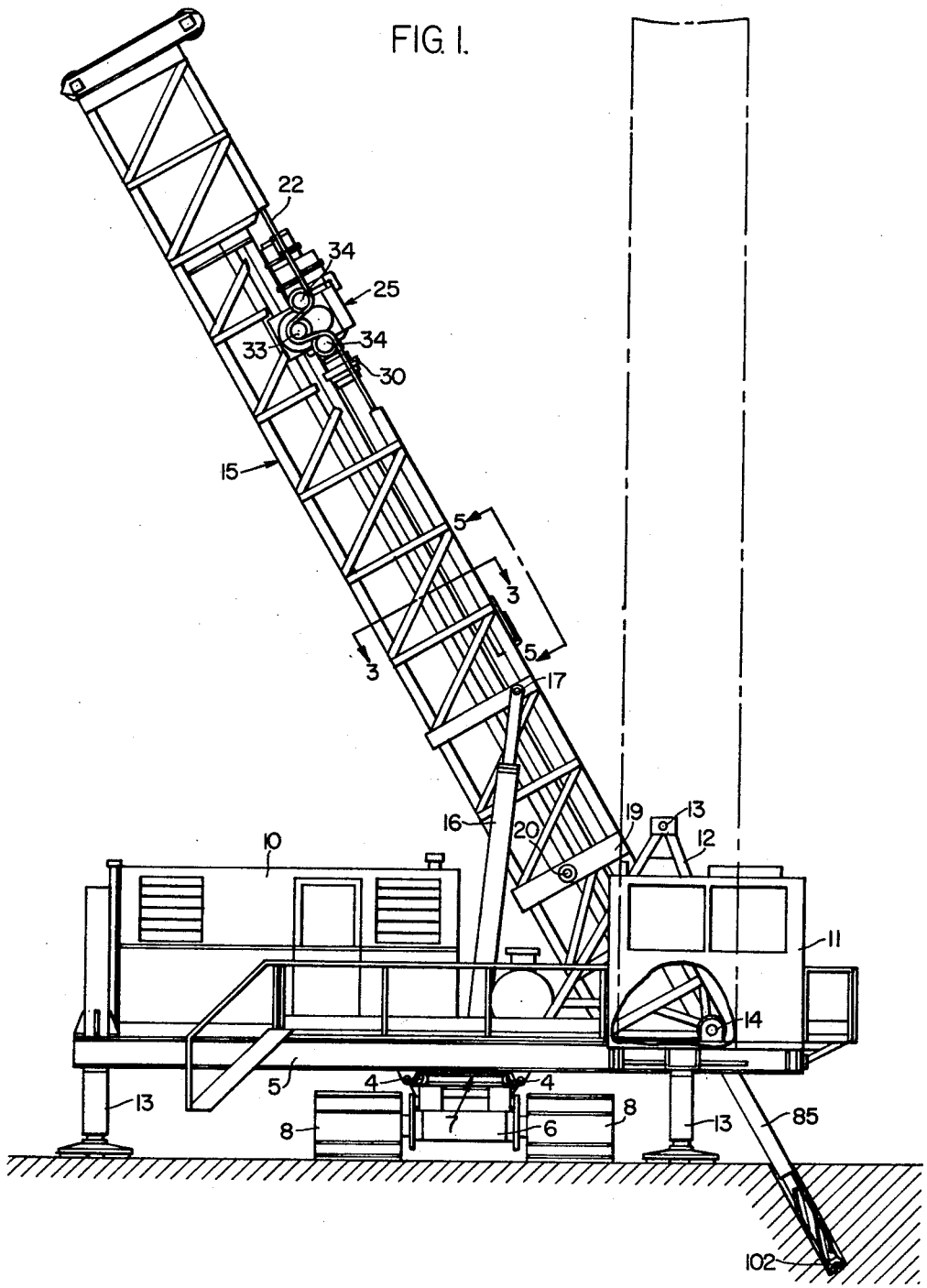
FIG. 1 is a simplified side elevational view of a blasthole drilling machine constructed in accordance with the principles of this invention with portions broken away.

Referring to FIG. 1 a rotary blasthole drilling machine that is the illustrative embodiment of this invention comprises a horizontally disposed mobile base 5, rotatably supported at its central portion by a crawler support frame 6 through a suitably internally threaded toothed ring gear 7. The crawler support frame 6 suitably supports a pair of spaced crawlers 8 which suitably position the drilling apparatus in a manner well known in the art and described in further detail in copending application Serial No. 140,068, filed September 22, 1961, which is assigned to the present assignee. Ring gear 7 has its outer peripheral surface circumferentially grooved to provide an upwardly and downwardly tapering side portions to receive in rolling contact a plurality of spaced frusto-conical bearing members 4 respectively rotatably mounted on suitable brackets which brackets are rigidly secured to the underside of the intermediate portion of the mobile base 5, whereby the mobile base 5 is suitably rotatable through a full 360° in relation to the crawler support frame 6. Suitable means such as a drive pinion may be rotatably mounted on the base 5 drivingly engaging the ring gear 7 to control the horizontal swing of the mobile base 5 relative to the crawler support frame 6.

The base 5 is supported by three spaced hydraulic leveling jacks 13 in substantially triangular disposed relationship for leveling and supporting the base 5 in a manner well known in the art. The base 5 supports a housing unit 10 which houses the air compressors, motors, hydraulic and electrical equipment (not shown) for the rotary drilling apparatus. The base 5 additionally supports the control cab unit 11 which houses the controls for operating for drilling apparatus and the auxiliary equipment to be described.

The forward portion of the horizontal mobile base 5 has an A-frame structure 12 (FIG. 1) suitably secured thereto. The A-frame structure 12 has a bore 13 at the apex thereof for a purpose to be described.

An elongated one piece derrick unit 15 has its lowermost end pivotally mounted as at 14 on the forward portion of the mobile base 5. The derrick 15 is adjusted about the transversely extending lower pivot means 14 by means of a pair of laterally spaced hydraulic jacks 16, which jacks 16 have their cylinder ends suitably connected to the mobile base 5 and their rod ends pivotably connected as at 17 to the intermediate lower portion of the derrick 15. A lower portion of the derrick 15 has a bracket 19 located between the lower pivotal connection 14 and the pivotal connection 17, which bracket 19 has a laterally extending bore 20 which aligns with the bore 13 on the apex of the A-frame 12 previously mentioned when the derrick 15 is adjusted by the hydraulic jacks 16 into its vertically extending position as shown in phantom lines in FIG. 1. Where it is desired to lower the derrick 15 to a horizontal position as for traveling or tramming an extended distance the lower pivotal connection 14 is loosened, and the lower end portion of the derrick 15 is connected to the A-frame 12 by aligning the bores 13 and 20 to provide a pivotal connection therebetween such that the pivotal connection 14 is transferred from the lower end portion of the derrick 15 to an intermediate portion of the derrick 15, namely bracket 19, whereby the aligned bores 13 and 20 provide means whereby the derrick may be lowered into a horizontal position to provide greater tramming stability for the drilling machine. By providing a double pivoting action for the derrick with respect to the base, greater versatility, stability and better drilling force is attained. It is to be understood that the derrick 15 as well as the auxiliary equipment to be described such as the storage rack and the pull down and drive mechanism are located on the derrick such that the derrick and the auxiliary equipment is located effectively either in the inclined position for angle hole drilling or in the vertical position for vertical holes. In inclined hole drilling, where the derrick 15 is inclined, with respect to a horizontal plane the thrust or reactive forces on the drill string is transferred to the drilling machine substantially at the center of gravity thereby maintaining better weight distribution which results in faster drilling.

Derrick 15 (FIGS. 1 and 6) has a pair of laterally spaced vertically extending chain racks 22 (only one of which is shown) suitably located in the forward portion of the derrick 15 with the respective upper and lower end portions of the chain 22 being secured to the respective upper and lower forward edges of derrick 15 whereby the chain rack 22 supports and guides the movement of a slidably mounted crosshead carrying a rotary drive and pull down unit 25 to be described.

The rotary drive and pull down unit 25 (FIG. 2) comprises a pair of variable speed, reversible, hydraulic motors 26 and 28, for rotary drive and pull down functions respectively, mounted upon and rotatably connected through clutch means to remotely controlled transmissions 27 and 29 respectively. It is to be realized that reference to hydraulic motors does not preclude the use of electric motors. The rotary drive transmission 27 is a four-speed transmission and pull down transmission 29 being a two-speed variety, wherein both transmissions 27 and 29 are similar to that shown in U.S. Patent 2,712,245 and in copending application Serial No. 140,068, filed September 22, 1961. The motors 26 and 28 are connected to the respective transmissions through suitable gearing and clutches to accomplish the rotary drive and pull down functions associated with the drilling operation. Referring to FIG. 2, the output drive means of the rotary drive transmission 27 is suitably connected to a drive coupling 30 which has a suitably threaded connection 31 for threaded connection to the upper end portion of a drill rod.

The pull down hydraulic motor 28 is drivingly connected to the pull down transmission 29 which has a suitable output means (FIGS. 1 and 6) comprising a pair of laterally spaced driving sprockets 33 drivingly engaged with the chain rack 22. The rotary drive and pull down unit 25 in addition to having spaced driving sprockets 33 additionally has a pair of vertically spaced idler sprockets 34 on the respective side portions of the rotary drive and pull down unit 25 substantially in the same vertical plane (as viewed from the front of the drilling machine) as the adjacent driving sprocket 33 such that each chain rack 22 is trained about the forward side of the idler sprockets 34 and trained about the rearward portion of the periphery of the adjacent drive sprocket 33. Rotation of the respective drive sprocket 33 will cause a reaction upon the chain rack 22 such as to raise or lower the rotary drive and pull down unit 25 in accordance with the direction of rotation of the driving sprocket 33. In order to provide additional guide and support means for the rotary drive and pull down unit 25 with respect to the derrick 15, each forward side edge portion of the rotary drive and pull down unit 25 has a pair of vertically spaced guide bracket members 35 (FIG. 2) which engage longitudinally extending guide portions of the derrick 15 to maintain the aligned relationship of the rotary guide unit 25 with respect to the derrick 15.

A stabilizer unit 38, (FIGS. 2-5) used to guide the drill rods when drilling and additionally for handling rods when drilling angle holes, is slidably mounted on the forward portion of the derrick 15 between the rotary drive and pull down mechanism and the lower portion of the derrick 15. The stabilizer unit 38 comprises a generally flat elongated stabilizer support member 39 that extends between the forward portions of the derrick with the respective lateral side portions thereof having guide plates 40 (FIG. 3) which straddle the forward portion of the derrick to guide the stabilizer unit in its movement on the derrick. Additionally, the respective lateral side portions of the support member 39 has a pair of spaced guide sheaves 41 secured thereto to serve a purpose to be described later. The intermediate portion of the stabilizer unit 38 supports a stationary drill rod guide plate 43 and a movable stabilizer arm 44 that cooperates with the stationary guide plate 43 in a manner to be described to handle drill rods. One end portion of the drill guide plate 43 has an arcuate recess thereon that receives an arcuate guide shoe 45 drawn on the same radius as the drill rods.

The movable stabilizer arm 44 is pivotally supported intermediate its ends by pivot pin 46 on the support member 39 with the one end portion of the movable stabilizer arm 44 being arcuately recessed to receive an arcuate guide shoe 45' which is similarly drawn on the same radius as the drill rod which is to be handled such as to complementarily define with the arcuate guide shoe 45 on the stationary drill rod guide plate 43 a cylindrical bore for guiding a drill rod 85. Suitably mounted on the intermediate portion of the stabilizer support member 39 is a hydraulic stabilizer cylinder 48 having a rod end 49 extending outwardly toward the axis of bore defined by the guide shoes 45 and 45'. The rod end of stabilizer cylinder 48 is operatively connected through a lever linkage 51 to the other end portion 50 of the movable stabilizer arm 44 such that the outward movement on the rod 49 of stabilizer cylinder 48 moves the end portion 50 of the movable stabilizer arm 44 inwardly towards the hydraulic stabilizer cylinder 48 thereby pivoting the outer arcuate guide shoe 45' on movable stabilizer arm 44 outwardly away from the drill rod 85 located in the center portion of the derrick. The pivotal connection 53 between lever 51 and the movable stabilizer arm 44 is such as to be offset from the pivot pin 46 such that upon failure of hydraulic pressure in stabilizer cylinder 48 the offset pivot of lever 51 will maintain movable stabilizer arm 44 in a closed position.

As shown in FIG. 4 each lateral side portion of stabilizer support member 39 has a pair of spaced sheaves 41. The upper portion of the derrick 15 immediately above the rotary drive and pull down unit 25 has a fixed cable support 55 (FIG. 6) and a cable 56 suitably fixed thereto. The cable 56 extends downwardly around the forward sheave 41 thence rearwardly and inwardly to the rearward sheave 41 and thence upwardly and connected to a fixed stationary bracket 57 on the rotary drive and pull down unit 25. This connection between the stabilizer unit 38 and the rotary drive unit 25 is such that when the overhead drive is at the top of the derrick 15, the stabilizer unit 38 is in the middle of the derrick 15, and as the overhead drive unit 25 moves downwardly, the stabilizer unit 38 follows at half the speed. When drilling and more than one drill rod has to be used, the stabilizer unit 38 is used as a support and guide means for the drill rod to be added or stored until the drill rod is joined with a rod held in the breakout mechanism in the bottom of the derrick or moved to the storage rack unit through automatic control means by impulses from limit switches to be described. The stabilizer unit 38 facilitates rod handling when drilling angle holes as well as vertical holes. Additionally the stabilizer unit serves as a guide for the drill rod during the drilling operation.

A rod handling unit 60 (FIG. 3) provides storage means for drill rods 85 such that whenever a drill rod is to be added to the drill string, the rod handling unit 60 is indexed into position to align a drill rod 85 below the threaded connection 31 of the rotary drive and pull down unit 25. The rod handling unit 60 is preferably designed to store four drill rods so that, with one drill rod 85 set up for drilling, three drill rods 85 are stored in the rod handling unit 60.

Figure 7:
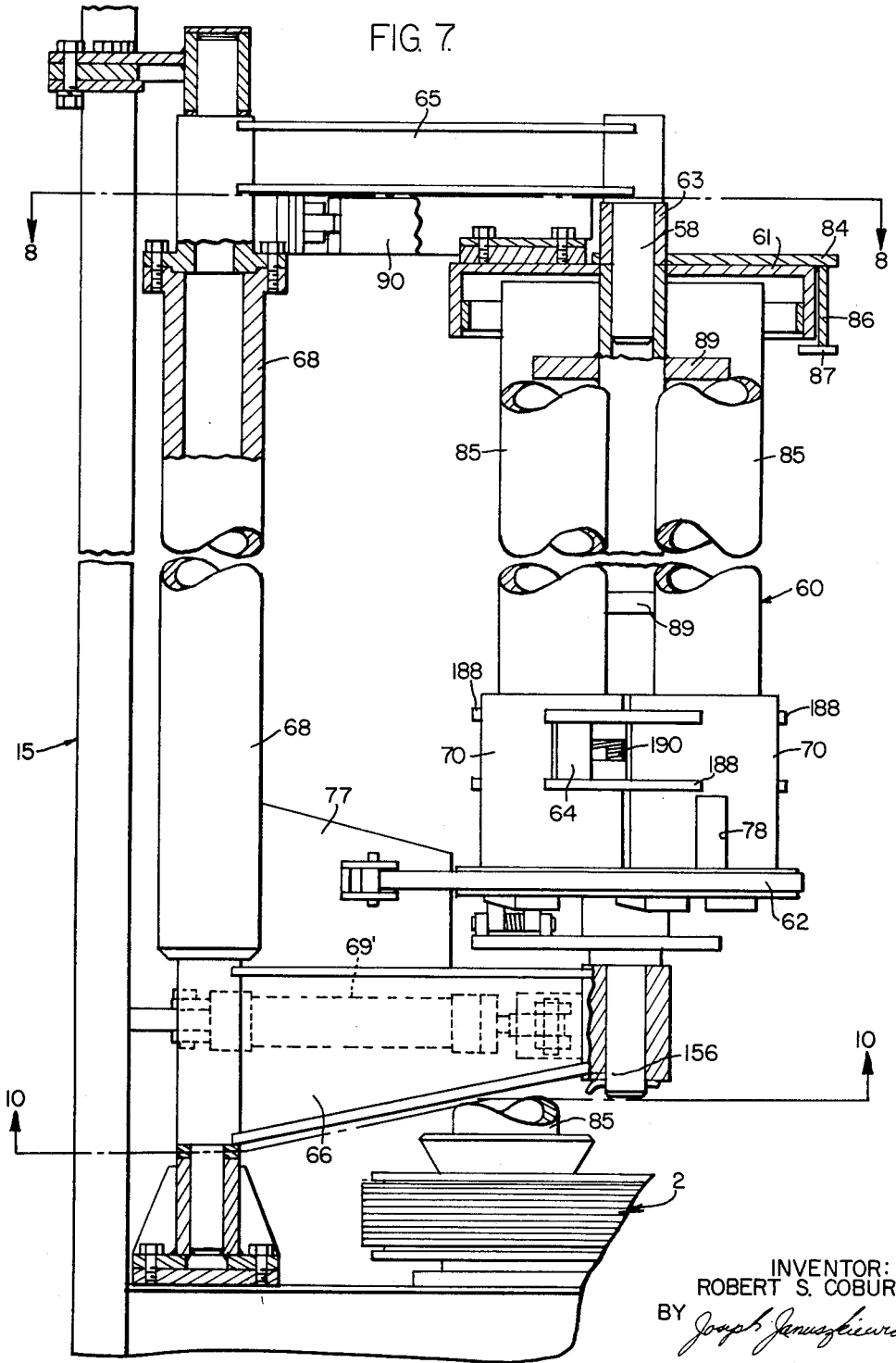
FIG. 7 is a side elevational view of the rod rack handling unit in the derrick with parts removed.

Rod handling unit 60 (FIG. 7) consists of a pair of spaced brackets, an upper bracket 61 and a lower bracket 62 respectively mounted to a swingable rod rack post 63 swingable about a vertical axis. The rod rack post 63 has its upper and lower end portions respectively suitably pivotally connected to the one end of horizontally disposed brackets 65 and 66 wherein bracket 65 is considered an upper bracket and bracket 66 is considered a lower bracket. The other ends of brackets 65 and 66 are suitably rigidly connected to a main pivot post 68, which post 68 is journaled for rotation on its axis at the rearward portion of the derrick 15 as shown in FIGS. 3 and 7. A hydraulic swing cylinder 69 (FIG. 3) has its cylinder end pivotably connected to the rearward portion of the derrick 15 and the rod end pivotally connected to the upper bracket 65 such that pressurization of the cylinder end of swing cylinder 69 extends the hydraulic jack and swings upper bracket 65 along with the rod rack handling unit 60 inwardly to the forward portion of the derrick 15 for a purpose to be described. Similarly a swing cylinder 69' (FIG. 7) has the cylinder end pivotally connected to the lower rear portion of the derrick 15 and the rod end connected to the lower bracket 66 to supplement the action of upper swing cylinder 69. The upper surface of lower bracket 62 has a plurality of rod cups 70 (FIG. 7) suitably secured thereto. The lower bracket 62 is rotatably mounted with the rod cups 70 whereas upper bracket 61 is suitably fixed to the upper bracket 65 to facilitate indexing as will be more fully developed hereinafter. The rod cups 70 are circumferentially spaced about the axis of swingable rod rack post 63 to suitably receive the lower ends of the respective drill rods 85 for the storage thereof. As shown clearly in FIG. 10 the under surface of lower bracket 62 has four equally spaced inclined cam plates 71 which cam plates 71 are circumferentially spaced around the axis of rod rack post 63. Each cam plate 71 has an inclined surface 72 (FIGS. 10–13) and a planar surface 73 that is generally normal to the horizontally disposed bottom surface of lower bracket 62. As shown in FIGS. 10 and 11 an elongated lever arm 74 is rotatably mounted on the lower portion of rod rack post 63 wherein the one end of lever arm 74 is pivotally connected to the rod end of a rod rack index cylinder 75 such that the extension or retraction of the rod rack index cylinder 75 will rotate lever arm 74 about rod rack post 63. The cylinder end of rod rack cylinder 75 is pivotally connected to a suitable bracket 77 (FIGS. 11 and 12) that extends from the lower bracket 66. The other end portion of lever arm 74 has a spring biased flapper 76 (FIGS. 10 and 11) suitably pivotably mounted thereon wherein the flapper 76 is biased into engagement with the underside of lower bracket 62. As seen in FIG. 10 the clockwise rotation of lever arm 74 moves flapper 76 along with it over the inclined surface 72 such that the continued clockwise movement of lever arm 74 causes the flapper 76 to move beyond the inclined surface 72 of the cam plate 71 immediately below it as viewed in FIG. 13 and to drop into engagement with the planar surface 73 on cam plate 71 such that the counterclockwise rotation of the lever arm 74 will cause the abutting surfaces between the lever arm 74 of flapper 76 to engage the planar surface 73 and rotate the lower bracket 62 in a counterclockwise direction on the counterclockwise movement of lever arm 74. As previously described the rotative movement of lever arm 74 is controlled by the extension and retraction of the cylinder rod end of the rod rack index cylinder 75. This movement of lower bracket 62 is the indexing of the rod handling unit which when coordinated with the description which is to follow illustrates the manner in which the rod handing unit positions the respective drill rods 85 beneath the rotary drive and pull down unit 25 so that a drill rod 85 may be removed from the rod handling unit for coupling to the rotary drive and pull down unit 25 for further coupling to the drill rod located in the hole drilled. As shown in FIG. 10 and FIG. 12 the lower bracket 62 has a plurality of spaced bores 79 extending from the outer periphery thereof inwardly radially toward the axis thereof which bores 79 cooperate with an index lock pin 80 to lock the rotative movement of the rod handling unit as well as lower brackets 62 to the brackets 77 and 66 (FIG. 12) to insure the rotative movement of the rod handling unit 60 about the main post 68 without relative movement of the rod handling unit 60 relative to brackets 65 and 66.

Suitably mounted on the bracket 77 is an index lock cylinder 81 having an extendible rod 82 which is suitably connected to the lock pin 80 such that the extension of the rod 82 upon pressurization of the index lock cylinder 81 will cause the extension of the locking pin 80 into the bore 79 on the lower bracket 62 to lock the bracket 62 to the respective brackets 77 and 66.

As shown clearly in FIGS. 3 and 7 the swingable rod rack post 63 has mounted thereon a plurality of longitudinally spaced flat plate members 89 that are star shaped to keep the drill rods 85 in their respective positions on the storage rack.

Upper bracket 61 is an annular flat plate having depending side portions as clearly shown in FIG. 7 with a generally U-shaped recess 61' (FIG. 8) in the bracket 61 extending from the central portion thereof to the outer periphery, which recess 61' facilitates the removal of one drill rod 85 at a time from the rod rack handling unit 60.

An elongated rod rack latch 84 (FIGS. 7 and 8) has its intermediate portion rotatably mounted on the upper end of the swingable rod rack post 63 for controlling the access to recess 61' of the rod handling unit 60. One end of the rod rack latch 84 has a depending arcuately shaped guide plate 86 slidingly engaging the depending side portions of the upper bracket 61. The guide plate 86 of rod latch 84 has a lower flanged edge portion 87 slidably engaging the lower portion of the upper bracket 61 to guide the rod latch 84 thereon. The other end portion of rod rack latch 84 is suitably pivotally connected to a rod latch cylinder 90 such that the extension and retraction of the rod end of rod latch cylinder 90 rotates rod rack latch 84 about the pivot axis of rod 63. The cylinder end of rod latch cylinder 90 is suitably pivotally connected to the upper bracket 65 to facilitate the movement of the rod handling unit 60. As shown in FIG. 8, the rod latch cylinder 90 is normally in the retracted position whereby the lower flanged edge portion 87 of guide plate 86 extends across the peripheral opening of recess 61' to prevent the removal of any drill rods 85 from the rod rack handling unit 60 whereas on energizing the head end of rod rack latch cylinder 90 causes an extension of of the rod cylinder 90 to pivot the rod rack latch 84 in a counterclockwise direction as viewed in FIGS. 8 and 9 to thereby pivot the lower flanged edge portion 87 of the latch 84 away from the recess 61' to provide access to recess 61' for the removal or return of a drill rod 85.

A power wrench mechanism 2 (FIGS. 2 and 14) and a power slip unit 1 (FIGS. 2 and 15) used in conjunction with each other to connect and disconnect drill rod joints during the drilling operation are mounted in the lower portion of the derrick and integral therewith, below the rod handling unit 60. The power slip unit 1 comprises a pair of lever arms 92 pivotally mounted intermediate their ends on pins 93 which pins 93 are journaled on support member 94 integral with the lower portion of the derrick 15. The rearward end portion of each lever arm 92 has a link 95 pivotally mounted thereto wherein each link 95 is also pivotally connected to a movable member 96. The forward end portion of each lever arm 92 is arcuately recessed as at 98 which recesses 98 are provided with a rectangularly shaped slot 91 which accommodates a key 97 suitably connected thereto in the center thereof so that upon pivotal movement of the forward end portion of lever arms 92 about pin 93, respective forward end portions of lever arm 92 are moved towards each other, such that the respective keys 97 engage notches on the upper portion of a drill rod 85 to be described to prevent movement thereof. A hydraulic cylinder 100 has its cylinder end pivotally mounted to a bracket 101 which is suitably fixed to the side portion of the derrick 15 while the rod end of hydraulic cylinder 100 is suitably connected to the movable member 96 such that upon pressurization of the head end of the hydraulic cylinder 100 the rod end thereof is caused to move downwardly as shown in FIG. 15 thereby moving the movable member 96 downwardly, which through the link connection 95 to lever arm 92 causes the rear portion of the respective lever arms 92 to be pivoted inwardly toward each other about pivot pin 93 thereby causing the separation or outward movement of the forward end portions of lever arms 92 to release the keys 97 from their seat with respect to the rod joint of the drill rod.

Power wrench mechanism 2 comprises an annular hub 105 suitably rotatably mounted on the forward portion of the derrick above the power slip unit 1. The axis of the bore of the annular hub 105 is in longitudinally aligned relationship with the axis of the drive coupling 30 of rotary drive and pull down unit 25. Annular hub 105 has a plurality of circumferentially spaced dogs 106 pivotally mounted thereon as at 107 wherein the pivotal connection 107 of the dogs 106 is such as to be equidistant from the axis of the central bore thereof and equidistant from each other. The end portion of each dog 106 adjacent the respective pivotal connection 107 is pivotally connected to a hydraulic cylinder 109, such that the cylinder end of each hydraulic cylinder 109 is suitably pivotally connected to the rim portions of annular hub 105 as at 110. Actuation of the hydraulic cylinders 109 pivots the dogs 106 about their pivotal connection 107 into engagement with the drill rod 85 such that counterclockwise rotation of annular hub 105 causes the outer end portions of the dogs 106 to engage the recesses in the drill pipe to be described. As shown in FIG. 14 the plan view of the lower portion of the derrick 15 which houses power wrench mechanism 2 has a hydraulic cylinder 111 suitably rigidly mounted in the right hand corner portion thereof. The rod end 112 of hydraulic cylinder 111 extends rearwardly from the forward portion of the cylinder 111 and has a bracket 114 suitably mounted thereon. Bracket 114 has a pair of sheaves 115 and 116 suitably mounted thereon, with sheave 116 being mounted on the intermediate portion thereof and sheave 115 being mounted on the outer end thereof. A chain 117 has one end suitably secured to the intermediate lateral portion of derrick 15 and is reaved about the intermediately located sheave 116 which is mounted on bracket 114, thence towards the hydraulic cylinder 111, thence around the forward circumferential portion of annular hub 105 and secured to a bracket 118 which is secured to the outer portion of annular hub 105. A bracket 119 rotatably supporting a guide sheave 120 is suitably fastened to the rearward portion of derrick 15 substantially on the same plane as the power wrench mechanism 2. A cable 121 has its one end connected to an adjustable support member 122 suitably mounted on the right hand rearward end portion of derrick 15 as shown in plan view in FIG. 14. Cable 121 is then wound about guide sheave 115, thence rearwardly around guide sheave 120 and thence to the bracket 118 on the annular hub 105. Actuation of hydraulic cylinder 111 causes the outward movement of the rod end 112 as well as the guide sheave 116 thereby causing clockwise rotation of the guide sheave 116 which thereby moves chain member 117 outwardly relative to the fixed connection to the lateral portion of the derrick 15 thereby causing the counterclockwise rotation of annular hub 105 which in turn carries the dog member 106 therewith such that if the hydraulic cylinders 109 are actuated, the forward end portion of the dogs 106 engage slots in the drill pipe which would cause a rotation of the drill pipe on continued rotation of the hub 105. In a similar manner the pressurizing of hydraulic cylinder 111 to cause the retraction of the rod end of the cylinder will move guide sheave 116 downwardly while simultaneously moving guide sheave 115 via bracket 114 downwardly (as viewed in FIG. 14) towards the hydraulic cylinder 111 such that guide sheave 115 exerts a downward pressure on the cable 121 causing a counterclockwise rotation of sheave 115, and a clockwise rotation of annular hub 105. The retraction of the hydraulic cylinders 109 causes the withdrawal of the dogs 106 from the respective recesses on the drill rod.

The drill rods of the present invention comprise four similarly constructed rods 85, however, only one will be described in detail. Drill rod 85 (FIG. 16) comprises a cylindrical tubular rod 125 having a bore 126 extending longitudinally centrally therethrough. Rod 85 has an upper female threaded joint 127 and a lower male threaded joint 128. The upper end portion of drill rod 85 is suitably circumferentially recessed as at 130 and is additionally provided with a pair of diametrically opposed recesses 131 which recess 131 prevents counter-clockwise rotation while permitting clockwise rotation as will be apparent. Each recess 131 (FIG. 18) has a pair of planar side surfaces 132 and 133 which are normal to each other. Respective side surfaces 132 are parallel to each other and parallel to the longitudinal axis of bore 126. Side surfaces 133 are generally parallel to each other. The lower end portion of rod 125 has a pair of diametrically spaced recesses 135 on the outer surface thereof, wherein each recess 135 has a pair of vertically disposed surfaces 136 and 137 that are normal to each other to define a shoulder therebetween. As shown in phantom lines in FIG. 19, the dogs 106 of the power wrench mechanism (FIG. 14) are adapted to be pivoted into engagement with the recesses 135 for breaking the joint between the lower male joint 128 and the adjacent female joint 127. In addition to recess 135 on the lower end portion of the drill rod 85, a notch 134 on the end thereof has planar side surfaces 185 the extension of which contains the axis of drill rod 85, and a planar surface 186 normal to planar surface 185. Notch 134 cooperates with a breakout dog 64 (FIGS. 7 and 20) located on rod rack handling unit 60.

Each rod cup 70 has a recess into which a breakout dog 64 projects. Each breakout dog 64 is pivotally mounted as at 189 on spaced brackets 188 which brackets 188 are suitably secured to the rod cups 70. A spring 190 mounted on pivot pin 189 suitably biases the breakout dog 64 into the rod cup 70 and as viewed in FIG. 20 such biasing action biases breakout dog 64 in a clockwise direction. Breakout dog 64 projecting into rod cup 70 is adapted to engage notch 134 of drill rod 85 to prevent counterclockwise rotation thereof whereby a drill rod 85 positioned in rod cup 70 and held by the drive coupling 30 is rotated thereby in a counterclockwise direction until dog 64 engages the planar surface 185 which prevents further rotation thereof so that upon continued rotation of drive coupling 30, drill rod 85 held thereby is uncoupled from the drive coupling 30. Clockwise rotation of the drill rod 85 by drive coupling 30 moves breakout dog 64 outwardly.

As shown in FIGS. 21-23, a switch 2LS, located closely adjacent the rod cups 70, is mounted on a bracket 193 that is secured to the extension of bracket 66. The lower end portion of each cup 70 is suitably recessed to accommodate the vertical movement of a flat plate 195 located therein. A portion of plate 195 extends outwardly through the recess in rod cup, to which portion a vertically extending rod 196 is secured. The upper end portion of rod 196 is flanged as at 197 to provide a seat for one end of a helical closed end compression spring 194. The other end of the spring 194 engages an annular shoulder 198 which is integral with or suitably secured to the upper end portion of rod cup 70. Spring 194 biases rod 196 and plate 195 upwardly relative to rod cup 70; however, where a drill rod 85 is seated in the rod cup 70, the bottom end portion of the drill rod 85 engages the flat plate 195 and maintains the plate 195 in engagement with lower bracket 62. Plate 195 has a switch trip lever 200 suitably secured thereto projecting radially outwardly from cup 70 for actuation of limit switch 2LS. Each rod cup 70 has a plate 195 mounted therein with a switch trip lever 200 controlled thereby, whereby indexing of the rod cups 70 on lower bracket 62 by rod rack index cylinder 75 (FIGS. 10-12) relative to bracket 66 and main post 68 brings the trip levers successively into engagement with switch 2LS. Although FIG. 22 discloses only one switch trip lever 200 for clarity it is to be understood that each rod cup has a switch trip lever 200.

The hydraulic circuit for controlling the indexing operation is shown in FIG. 24 wherein a pump P-1, suitably powered, pumps pressurized fluid from a source T to a conduit 141. A branch conduit 142 suitably connected to the main conduit 141 is connected to a cam actuated valve 150 which upon actuation of cam 152 operates index lock valve 151. It is to be noted in FIG. 24 that hydraulic cylinder 75 has the cam 152 mounted on its rod such that the energization and deenergization of cylinder 75 controls the movement of cam 152 which in turn operates valve 150. Cam actuated valve 150 in its normal position is closed such as to render index lock valve 151 biased into its first position such as to maintain the cylinder end of index lock cylinder 81 pressurized to lock the rod rack handling unit 60 integral with the brackets 77 (FIG. 12) and 66 such as to prevent indexing of the rod cups relative to the rod rack post 63 (FIG. 7). Upon actuation of cam valve 150 by cam 152 branch conduit 142 energizes index lock valve 151 into its second position which retracts the lock pin 80 of index lock cylinder 81 to permit the indexing of the drill rods 85 and rod cups 70 with the swingable rod rack post 63 about pivot shaft 58 (FIG. 7). Stabilizer valve 159 in its normal position is spring biased to connect pressurized conduit 141 via conduit 143 to the rod end of the stabilizer cylinder 48 to maintain the stabilizer cylinder 48 in its retracted position. As viewed in FIG. 3 the stabilizer cylinder 48 is in its retracted position such as to maintain the movable stabilizer arm 44 in engagement with the drill rod 85. Stabilizer valve 159 is operated by solenoid "B" such that upon energization thereof the stabilizer valve 159 is moved to connect pressurized line 143 to the head end of stabilizer cylinder 48 whereas the rod end of stabilizer cylinder 48 is connected to the reservoir "T." Rod latch valve 153 in its normal spring biased position connects pressurized line 141 via conduit 144 to the rod end of rod latch cylinder. Rod latch valve 153 is controlled by solenoid "A" so that upon energization of solenoid "A" pressurized line 141 is connected to the head end of the rod latch cylinder 90 whereas the rod end is connected via suitable conduit means to the tank "T." The rod rack swing cylinders are pressurized by an independent circuit wherein a pump P-2 pumps pressurized fluid from a source T to a conduit 157 which supplies pressure to the rod rack index valve 155 and rod rack swing valve 154. Rod rack swing valve 154 is controlled by solenoids "C" and "D" independently such that upon deenergization of solenoids "C" and "D" conduit 157 is connected to return the pressurized fluid to tank "T." Upon energization of solenoid "D" conduit 157 is connected to a conduit 147 which is thence connected to the rod end of rod rack swing cylinders 69 and 69'. Upon deenergization of solenoid "D" pressurized conduit 157 is again connected to tank "T" whereas conduit 147 is locked such as the fluid contained therein maintains rod rack swing cylinders in their given position. Energization of solenoid "C" connects pressurized conduit 157 to conduit 148 which is connected to the head end of rod rack swing cylinders 69 and 69' to cause the extension thereof and upon deenergization of solenoid "D," the trapped fluid contained in conduit 148 and the head ends of rod rack swing cylinders 69 and 69' maintains the cylinders in their preselected position.

Rod rack index valve 155 is controlled by solenoids "E" and "F" such that upon energization of solenoid "F," pressurized conduit 157 is connected to a conduit 159 which is connected to rod end of rod rack index cylinder 75 which causes the retraction thereof whereas the energization of solenoid "E" connects the pressurized conduit 157 to conduit 149 which is connected to the head end of rod rack index cylinder 75 which causes the extension of the rod therefrom.

A schematic electrical diagram of the operation of the stabilizer and the rod handling unit is shown in FIG. 25. A suitable power source is connected to a pair of conductors 160 and 161 with a conductor 162 branching from conductor 160 to a normally open switch 1LS. Switch 1LS is connected to a pair of parallel electrical conductors 163 and 164 through a movable switch 2LS, which switch 2LS is movable either into contact with conductor 163 when a rod 85 is seated in cup 70 or conductor 164 when the rod 85 is lifted off the bottom of cup 70. Connection through conductor 163 energizes solenoid "A" which actuates the rod latch valve 153 whereas connection through conductor 164 energizes solenoid "B" which actuates the stabilizer valve 159. In parallel connection with conductor 162 is a conductor 165 which connects to manually operated switches 175 and 176. Switch 175 connects conductor 165 to solenoid "C" whereas switch 176 connects conductor 165 to solenoid "D." Solenoids "C" and "D" actuate the rod rack swing valve 154 which controls the movement of the rod rack swing cylinders 69 and 69'. In parallel connection with conductors 162 and 165 is a conductor 166 which connects conductor 160 to manually operated index control switches 177 and 178 respectively. Switch 177 controls the energization of solenoid "E" whereas switch 178 controls the energization of solenoid "F." Solenoids "E" and "F" in turn actuate a rod rack index valve 155 which controls rod rack index cylinder 75.

The control circuit for the power slip unit 1 and power wrench mechanism 2 is shown in FIGS. 26 and 27 wherein a pump P-3 pumps pressurized fluid via conduit 168 to a spring biased power slip valve 156 which valve 156 is controlled by solenoid H such that with the solenoid "H" de-energized the power slip valve 156 connects pressurized conduit 168 to the head end of the power slip cylinder 100 maintaining the power slips in the inoperative position. Energization of solenoid "H" actuates power slip valve 156 to connect pressurized conduit 168 to the rod end of power slip cylinder 100 to actuate the power slips in a manner described above wherein the lever arms 92 are pivoted to grasp the drill rod 85. The power wrench 2 is controlled by a control valve 158 which receives pressurized fluid from a pump P-4 via conduit 140. Control valve 158 in its normal position maintains the power wrench cylinders 109 in their selected positions of extension or retraction as will be apparent from further discussion. Control valve 158 is actuated either by solenoids "J" or "K" wherein energization of solenoid "J" actuates power wrench control valve 158 to connect pressurized conduit 140 to the rod end of hydraulic cylinders 109 such that the dogs 106 (FIG. 14) are retracted to their outermost position in the annular hub 105. Energization of solenoid "K" actuates power wrench valve 158 to connect the pressurized conduit 140 to the head end of the hydraulic dog cylinders 109 and the hydraulic cylinder 111 such that the dogs 106 are pivoted inwardly for engagement with the shoulders on the drill rod joints whereas hydraulic cylinder 111 upon being pressurized causes the rotation of annular hub 105 which causes the dogs 106 upon engagement with the notches in the drill pipe to unscrew the joint. Solenoids "H," "J" and "K" (FIG. 23) are suitably controlled by manually operated switches 180, 181 and 182, respectively.

*Operation*

The apparatus of this invention is brought to the drilling site by suitable manipulation of the crawlers 8 under control of an operator in a manner well known and understood in the art. The derrick unit 15 is raised from the horizontal position to either a vertical position or one for an angle position such that the angle subtended is an acuate angle between the vertical and the derrick. The drilling machine once located at the drilling site is leveled through the proper actuation of the hydraulic jacks 13 in a manner well known and understood in the art. Thereafter by admitting pressurized fluid to the head end of the hydraulic jacks 16 the derrick 15 is pivoted about the pivotal mounting of the A-frame 12 and the aligned bores 20 and 13 being coincident until the derrick 15 assumes the vertical attitude shown in phantom lines in FIG. 1. Upon reaching this vertical assumed position, the hydraulic jacks 16 are locked in position and the bottom pivot pin 14 is transferred from the aligned bores 20 and 13 to the now aligned pivotal connection 14 at the lower extremity of the derrick adjacent the forward portion of the mobile base 5. The derrick is now in position for vertical drilling as well as for angle hole drilling such that the admission of pressurized fluid to the rod end of the hydraulic jacks 16 will rotate the derrick 15 about the pivotal connection 14 to produce the desired angle of inclination of the derrick 15 such as shown by the solid outline thereof in FIG. 1 and thereby accomplishes angle face drilling. With the derrick 15 in the desired position relative to the mobile base 5, the base 5 may be rotated about the axis of the ring gear 7 through suitable means to bring the derrick 15 into appropriate angular position or relationship with the surface of the ground to be drilled. The apparatus now being correctly positioned is secured in position, and leveled again if necessary. A drill bit 102 (FIG. 1) is threadedly engaged with the drill rod 85, with the uppermost drill rod 85 being connected to a drive coupling 30 for lowering into contact with the surface to be drilled, wherein the drill rod 85 and bit 102 are driven by the rotary drive and pull down unit 25. The rotary drive and pull down unit 25 exerts a downward force on the rotary drill bit 102 by suitable action of the sprockets 33 and 34 acting on the chain rack 22 driven by the fluid operated motor 28 as hereinbefore made clear. Rotary action to the drill rod 85 is provided by the rotary drive motor 26 which through suitable gearing and transmission 27 exerts a rotation upon the drive coupling 30 which in turn transmits the rotational force to the drill rods or drill rod 85 and thence to the drill bit 102.

Where a drill rod 85 is not in coupled relationship with the drive coupling 30, the rotary drive and pull down unit 25 is raised to its uppermost position through suitable action of the drive sprocket 33 acting on the chain rack 22 driven by the fluid motor 28 to clear the rod handling unit 60 preparatory to an indexing operation.

With the rotary drive and pull down mechanism 25 in the fully retracted position, such that the pull down mechanism 25 is at its uppermost position in the derrick 15, and there are no drill rods 85 coupled to the drive coupling 30, the rod rack handling unit 60 is in its storage position with switch 1LS being open, so that solenoids "A" and "B" remain deenergized. Rod latch valve 153 and stabilizer valve 159, controlled by solenoids "A" and "B" respectively, are connected to pressurized conduit 141 via conduits 144 and 143 respectively to conduct pressurized fluid to the rod ends of rod latch cylinder 90 and stabilizer cylinder 48. With the stabilizer cylinder 48 retracted, the lever 44 (FIG. 3) connected to the rod of stabilizer cylinder maintains the movable stabilizer arm 44 in its closed position.

With the rod handling unit 60 in the storage position, energization of solenoid "C" through actuation of switch 175 connects the head end of rod rack swing cylinders 69 and 69' which action extends the rods of the swing cylinders 69 and 69' to pivot the rod handling unit 60 about the main post 68, which as viewed in FIGS. 3 and 8 is a clockwise rotation about main post 68. Simultaneously with this action switch 1LS is closed by the action of a chain 103 fastened to the main post 68 and with switch 2LS positioned to actuate solenoid "B" for loading a drill rod to the drive coupling 30, such that upon energization of solenoid "B," valve 159 connects pressurized conduits 141, and 143 with the head end of the stabilizer cylinder 48 to extend the rod therefrom to pivot movable stabilizer arm 44 (FIG. 3) clockwise about pivot pin 46 to open the stabilizer for reception of a drill rod 85. The action of the stabilizer is timed so that the stabilizer opens before the drill rod 85 arrives at loading position. The rod latch cylinder 90 (FIGS. 7, 8 and 20) remains retracted so that the rod rack latch 84 is in its fully extended position preventing the removal of a drill rod 85. The rotary drive and pull down unit 25 is then lowered until the threaded connection on the drive coupling 30 engages the upper threaded joint on the drill rod 85 such that upon rotation of the drive coupling 30 the drive coupling 30 is connected to the drill rod 85 positioned immediately below it. The rotary drive and pull down unit 25 is then raised with the drill rod 85 connected thereto high enough so that the lower end portion of the drill rod 85 clears the top of the rod cup 70. Switch 2LS is connected to conductor 163 and disconnected from 164 by the unseating of the rod 85 in the cup 70 thereby deenergizing solenoid "B" which thereby connects pressurized conduit 141 (FIG. 20) to the rod end of stabilizer cylinder 48 which pivots movable arm 44 in a counterclockwise direction (FIGS. 3 and 4) to close the stabilizer unit to thereby support the drill rod 85 in position as it is lifted out of cup 70. By movement of switch 2LS to conductor 163 solenoid "A" is energized thereby actuating rod latch valve 153 to connect pressurized conduit 141 to the head end of rod latch cylinder 90 to thereby extend the rod therefrom to pivot rod rack latch 84 counterclockwise to permit the return (counterclockwise rotation as viewed in FIG. 6) of the rod handling unit 60 to its storage position. The actuation of switch 176 and deactuation of switch 175 energizes solenoid "D" which connects pressurized conduit 157 to conduit 147 which conducts pressurized fluid to the rod end of rod rack swing cylinders 69 and 69' to thereby swing the rod handling unit 60 counterclockwise about the main post 68 to return the rod rack handling unit 60 to its storage position. Switch 1LS is opened as the chain 103 connected to main post 68 (FIGS. 3 and 8) releases or opens switch 1LS thereby deenergizing solenoid "A" causing the rod latch cylinder 90 to retract and close the rod rack latch 84.

The drill rod 85 held by drive coupling 30 is now held in alignment with the hole to be drilled, with the drill rod 85 being guided and stabilized by the stabilizer unit 38 ready for drilling.

Assuming that a drill rod is to be removed from the drill string and is to be loaded into the rod rack handling unit 60, the following operations are performed. The rotary drive and pull down mechanism 25 is moved into its uppermost position in the derrick 15 such that the drill rod 85 connected thereto is drawn upward with it with the lower end of its joint being moved into alignment with the power slip unit 1 and power wrench mechanisms 2 such as to disconnect the lower joint after which the rotary drive and pull down unit 25 along with the uppermost drill rod 85 is moved upward relative thereto so that the drill rod 85 is raised high enough by the overhead drive unit 25 so that the end of the drill rod 85 clears the top of the rod cups 70. Switch 2LS in its normal operating position is conditioned to connect the power supply to energize solenoid "A" which actuates valve 153 to connect pressurized conduit 141 to the head of rod latch cylinder 90 to effect extension of the rod to operate the rod rack latch 84; however, this is done during movement of rack 60 toward its loading position. Actuation of switch 175 energizes solenoid "C" which actuates rod rack swing valve 154 to conduct pressurized fluid from pressurized line 157 via conduit 148 to the head end of the respective rod rack swing cylinders 69 and 69' which action thereby swings the rod rack handling unit 60 underneath the rotary drive and pull down mechanism 25 such that the drill rod 85 is in axial alignment with the empty rod cup 70. This action of rod rack swing cylinders 69 and 69' rotates the main post 68 to actuate switch 1LS which energizes solenoid "A" such that the pressurized fluid via pressurized line 141 flows via conduit 144 to the head end of the rod latch cylinder 90 to extend the rod end which causes the counterclockwise movement of rod rack latch 84 to permit the lateral movement of a drill rod 85 into the rod rack handling unit 60. This operation is timed so that the rod latch 84 is opened before the rod rack handling unit 60 arrives at its loading position i.e. so that the drill rod 85 is in axial alignment with the empty rod cup 70.

The drill rod 85 connected to the rotary drive and pull down unit 25 is lowered into the rod cup 70 and disconnected from the drive coupling 30 of the overhead drive unit 25 by the rotary motion through the drive coupling 30 since the lower end portion of the drill rod 85 is held stationary by the breakout dog 64. Solenoid "A" is then deenergized by actuation of switch 2LS by the movement of the drill rod 85 in the cup 70 since the switch trip lever 200 engages the limit switch 2LS so that rod latch valve 153 is returned to its normal position through the action of its spring biased valve (FIG. 24) whereby pressurized fluid flows via conduit 144 to the rod end of cylinder 90 causing the rod latch 84 to close while simultaneously solenoid "B" is energized causing the stabilizer unit 38 to open as set forth above. The rod rack handling unit 60 is then moved back into storage position by energization of solenoid "D" which actuates rod rack swing valve 154 to conduct pressurized fluid via conduit 147 to the rod end of the rod rack swing cylinders 69 and 69' thereby swinging the rod handling unit 60 back into storage position. Switch 1LS is opened as the main post 68 swings or pivots thereby opening the circuit solenoid "B" thereby deenergizing solenoid "B" which causes the stabilizer valve 159 to return to its normal position whereby the rod end of the stabilizer cylinder is pressurized causing the stabilizer to close. The overhead drive is then lowered to the bottom of the derrick so that the spindle can be connected to the remaining drill rod or rods 85 in order to remove them from the drilled hole.

The index mechanism above described serves the function of rotating the rod rack handling unit 60 about its axis in order to position a rod cup 70 prior to the moving of the rod rack handling unit 60 into position for loading or unloading the drill rods 85. The rod rack index cylinder 75 shown in FIG. 10 is normally left in the extended position, the position it assumes when an index cycle is completed. As shown in FIG. 12 the index lock cylinder 81 has its rod 82 extended such that the lock pin 80 is also extended so that the rod rack handling unit 60 is held in locked position while in the storage position. In order to index the rod handling unit 60 solenoid "F" is energized by index control switch 178 which actuates rod rack index valve 155 to position valve 155 to connect pressurized conduit 157 to conduit 148 to pressurize the rod end of rod rack index cylinder 75 which causes the retraction of the index cylinder 75 thus rotating the lever arm 74 and the spring biased flapper 76 into position to engage one of the cam plates 71 on the bottom of the lower bracket or cup table 62 which in FIG. 11 is the clockwise rotation of the lever arm 74 such that the flapper 76 moves over the cam plate 71 until the forward portion of the flapper 76 abuts the stop shoulder or planar surface 73 on the cam plate 71. When the index cylinder 75 reaches the end of the retraction stroke, a cam 152 (FIG. 24) on the piston rod of the rod rack index cylinder 75 actuates the index lock valve 150 to unlock the rod handling unit 60.

The actuation of the cam on the rod of the rod rack index cylinder 75 actuates cam valve 150 which moves index lock valve 151 to connect pressurized conduit 141 to connect the pressurized fluid to the rod end of the index lock cylinder 81 thereby retracting the index lock pin 80 so that the rod rack handling unit 60 is free to rotate. Solenoid "E" is then energized by the actuation of switch 177 which action moves the rod rack index valve 155 to connect the pressurized conduit 157 to conduit 149 to the head end of rod rack index cylinder 75 to thereby extend the rod rack index cylinder 75 which action rotates the rod rack unit 60 along with the forward movement of the index cylinder 75. As soon as the rod of the index cylinder 75 extends, the cam 152 carried therewith releases cam valve 150 (FIG. 24) which permits the spring biased index lock valve 151 to return to its normal position which causes the index lock cylinder 81 to extend its locking pin into engagement with one of the four holes in the lower bracket or cup table 62 to thereby prevent rotation of the lower bracket or cup table 62. The rod rack handling unit 60 is then locked against further turning. The cycle is now complete and the rack handling unit is ready to be moved into loading or unloading position.

The power wrench 2 and the power slip unit 1 cooperate with each other to connect and disconnect the drill rod joints during the drilling operation. When the joints are being connected or disconnected, the power slip unit 1 restrains the lower drill rod 85 or drill rods 85 from turning and also supports their weight to prevent the drill rods 85 from falling into the drilled hole. When two joints are being disconnected, the power wrench mechanism 2 engages the upper rod 85 and turns it with respect to the rod or rods 85 being held in the breakout mechanism. The power wrench 2 however, is not used when connecting two joints since this is done by the overhead drive mechanism.

When the uppermost drill rod is drilled into the ground substantially to the full length of its travel the top end of the drill rod 85 is positioned so that the annular groove 130 and the notches 131 on the female joint are lined up with the power slip arms 92. The power slip unit 1 is normally in the open position and the power slip cylinder 100 is normally extended to keep the power slip arms 92 disengaged from the drill rods 85. Energization of solenoid "H" connects pressurized conduit 168 to the rod end of the power slip cylinder 100 causing the retraction of the piston therein which pivots the power slip arms 92 toward each other to engage the notches 131 on the upper end of the drill rod 85. Where the keys 97 do not engage the notches 131 of the drill rod, the drill rod 85 is then rotated in a reverse direction by the overhead drive unit 25 so that the keys 97 on the slip arms 92 jump into place into the notches 131 on the female joint giving a sharp blow to the joint and causing it to unscrew. The drill rod 85 is then held tight against further turning as soon as the slip keys 97 are seated in the notches 131, and the spindle can be then disconnected from the drill rod by further rotation. The overhead drive and pull down mechanism 25 is then moved to the top of the derrick 15 to pick up the next drill rod 85 out of the rod rack handling unit 60 when the rod rack handling unit 60 is rotated or indexed into position. The next drill rod 85 is added to the drill rod 85 being held by the power slip unit 1 by feeding a male joint into the female joint while simultaneously turning the rod with the overhead drive and pull down unit 25. As soon as the joint is connected, the power slip unit 1 is opened by deenergizing solenoid "H" to permit drilling operation to resume.

At the completion of a drilled hole, the joint between the top two rods is raised up to where the annular groove 130 and the notches 135 on the lower rod line up with the power slip arms 92 of the power slip unit 1 so that upon energization of solenoid "H" pressurized conduit 168 is connected to the rod end of the power slip cylinders 100 to actuate the power slip arms 92 and keys 97 into engagement with the notches 135 on the drill rod. Energization of solenoid "K" by the power wrench control switch 182 actuates power wrench valve 158 which causes the pressurized conduit 140 to conduct pressurized fluid via suitable conduits to the head end of dog cylinders 109 to force the extension of the four dogs 106 on the annular hub 105 into engagement with the drill rod 85. As the hydraulic cylinder 111 extends, the annular hub 105 of power wrench mechanism 2 is caused to rotate about the axis of the drill rods 85 in a counterclockwise direction and the four dogs 106 in the power wrench mechanism, are forced against the drill rod 85 by the extension of the dog cylinders 109 so that as the wrench continues to rotate the dogs 106 engage the notch 135 of the drill pipe such as to unscrew the upper drill rod from the lower drill rod. If the power wrench cylinder 111 reaches the end of its stroke before the joint is broken, the hydraulic cylinder 111 can be retracted by energizing solenoid "J" which causes power wrench valve 158 to connect the rod end of cylinder 111 to the pressurized conduit 140 whereby the power wrench rotates clockwise and returns to its starting position; however, in this instance the dogs 106 will not cause the drill rod 85 to rotate since the dogs 106 are also in their retracted position. It is necessary to continue advancing and retracting the power wrench until the drill rods are turned to the point where the keys 97 on the power slip arms 92 will engage the notch 131 on the female joint at the connection being unscrewed. When this occurs the lower rod is then held against further rotation and the power wrench can then exert enough torque to the upper rod to cause it to unscrew from the lower rod. As soon as the joint is loosened the overhead drive and pull down unit 25 is then used to finish unscrewing the joint. The upper rod is now ready to be loaded into the rod rack handling unit 60 while the remaining rods are left hanging in a drilled hole while they are being supported by the power slip mechanism 1. The rod which has been disconnected is now raised up by the overhead drive and pull down mechanism 25 so that the rod rack handling unit 60 can be positioned under it. The rod to be disconnected must now be removed from the spindle and this is done by engagement of the notch 134 on the bottom of the drill rod 85 by the breakout dog 64. The dog 64 is spring biased by means of spring 190 so that dogs 64 are biased into engagement with the drill rod 85. After the drill rod 85 has been lowered into the cup, the overhead drive unit 25 is operated in the reverse direction to cause the drill rod 85 to turn until the notch 134 engages the dog 64 which then stops the drill rod rotation and allows the spindle to unscrew itself from the drill rod held by the cup. After this joint is disconnected, the rack is moved back to its storage position so that the overhead drive and pull down mechanism 25 can be moved down to pick up the remaining rods hanging in the drilled hole. Successive joints are disconnected in the same manner as described above.

Preferred embodiments of this invention having been described and illustrated it is to be realized that modifications thereof may be made without departing from the broad scope of this invention. Accordingly, it is respectfully requested that this invention be interpreted as broadly as possible and be limited only by the prior art.

I claim:
1. A drilling apparatus having a base mounted on a crawler support, means for rotatably adjusting said base relative to said crawler support, a derrick adjustably supported on said base, means mounted on said base operatively connected to said derrick for adjusting the angular drilling position of said derrick relative to said base, power drill means mounted on said derrick for movement thereon, an indexable drill pipe storage rack mounted on said derrick for movement therewith, means operatively connected to said derrick and said rack for selectively positioning said rack into and out of position under said power drill means for selective coupling of pipe located in said storage rack to said power drill means, an auxiliary support longitudinally spaced from said power drill means and movably mounted on said derrick for selec- tively supporting such drill pipe held by said power drill means, and means connecting said auxiliary support to said power drill means and to said derrick for predetermined movement of said auxiliary support with and relative to said power drill means.

2. A drilling apparatus as set forth in claim 1 wherein said auxiliary support has a movable arm cooperative with a stationary arm member for supporting such drill pipe.

3. A drilling apparatus as set forth in claim 2 wherein said auxiliary support has means operatively connected to said movable arm for moving said arm into a retracted position for providing access for such drill pipe to be moved into and out of position under said power drill means by said storage rack.

4. A drilling apparatus as set forth in claim 3 wherein said means for moving said arm of said auxiliary support is responsive to the position of said storage rack.

5. A drilling apparatus comprising a mobile base with an elongated derrick having at one end a pivotal connection to said base, means for adjusting the angular position of said derrick about said pivotal connection, a cross head slidable longitudinally along said derrick, feed means mounted on said cross head operatively connected to said derrick for moving said cross head along said derrick, a drill rotating element journaled within said cross head, means on said cross head for rotating said drill rotating element, and a drill support means mounted on said derrick for movement relative to said cross head and said derrick wherein said drill support means supports a drill rod held by said drill rotating element, a drill rod handling and racking apparatus supported by said derrick for selectively connecting and disconnecting sections of drill pipe to and from said drill rotating element, said drill support means being cooperative with said rod handling and racking apparatus for supporting drill rods during a portion of a rod handling operation, said drill support means having a movable arm cooperative with an arm member for supporting such a drill pipe and means operatively connected to said movable arm for moving said arm into a retracted position for providing access for such a drill pipe to be moved by said rod handling and racking apparatus into and out of position under said drill rotating element.

References Cited by the Examiner
UNITED STATES PATENTS

| | | | |
|---|---|---|---|
| 2,726,065 | 12/55 | Feucht | 173—147 |
| 2,781,185 | 2/57 | Robbins | 175—85 X |
| 2,849,212 | 8/58 | Robbins | 175—85 X |
| 2,958,514 | 11/60 | Lee | 175—122 |
| 2,972,388 | 2/61 | Thornburg | 175—52 |
| 3,025,918 | 3/62 | Leven | 175—52 |
| 3,101,006 | 8/63 | Kurt | 173—160 X |

CHARLES E. O'CONNELL, *Primary Examiner.*